United States Patent
Purwin et al.

(10) Patent No.: US 10,328,836 B2
(45) Date of Patent: Jun. 25, 2019

(54) ACTIVELY BALANCED MOBILE DRIVE UNIT

(71) Applicant: Amazon Technologies, Inc., Seattle, WA (US)

(72) Inventors: Oliver Christoph Purwin, Andover, MA (US); Dragan Pajevic, Arlington, MA (US); David William Guerin, Boylston, MA (US); Robert Michael Shydo, Jr., Pelham, NH (US); Mark Anthony Messina, Hooksett, NH (US); Parris S. Wellman, Reading, MA (US); Kevin John Trenholme, Stow, MA (US); Peter Thomas Colantonio, North Andover, MA (US); Peter K. Mansfield, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 560 days.

(21) Appl. No.: 14/863,263

(22) Filed: Sep. 23, 2015

(65) Prior Publication Data

US 2017/0083020 A1 Mar. 23, 2017

(51) Int. Cl.
*G05D 1/00* (2006.01)
*G05D 1/02* (2006.01)
(Continued)

(52) U.S. Cl.
CPC ................ *B60P 1/02* (2013.01); *B25J 5/007* (2013.01); *B65G 63/002* (2013.01); *B66F 9/063* (2013.01);
(Continued)

(58) Field of Classification Search
CPC ........ B25J 5/007; B65G 63/002; B66F 9/063; B66F 9/07554; G05D 1/0297;
(Continued)

(56) References Cited

U.S. PATENT DOCUMENTS 6,302,230 B1   10/2001 Kamen et al.
8,280,547 B2 * 10/2012 D'Andrea ............... B66F 9/063
                                                       700/214

(Continued)

FOREIGN PATENT DOCUMENTS

EP       1703353     9/2006
WO       0245914     6/2002

OTHER PUBLICATIONS

Kumaga et al., "Development of a robot balanced on a ball—application of passive motion to transport", *IEEE International Conference on Robotics and Automation*, (May 12-17, 2009), pp. 4106-4111.
PCT/US2016/053196 , "International Search Report and Written Opinion", dated Dec. 7, 2016, 14 pages.
PCT/US2016/053196, "International Preliminary Report on Patentability", dated Apr. 5, 2018, 10 pages.

*Primary Examiner* — Jerrah Edwards
(74) *Attorney, Agent, or Firm* — Kilpatrick Townsend & Stockton LLP

(57) ABSTRACT

An inventory system includes an inventory holder and an actively balanced mobile drive unit. A control module of the mobile drive unit can receive sensing information about the inventory holder and/or the mobile drive unit and use the sensing information to control a drive module of the mobile drive unit so as to maintain the inventory holder and/or the mobile drive unit within a predetermined deviation amount from an equilibrium state.

19 Claims, 10 Drawing Sheets

(51) Int. Cl.
   *B60P 1/02*   (2006.01)
   *B65G 63/00*  (2006.01)
   *B25J 5/00*   (2006.01)
   *B66F 9/06*   (2006.01)
   *G06Q 10/08*  (2012.01)
   *G05D 1/08*   (2006.01)

(52) U.S. Cl.
   CPC ......... *G05D 1/0297* (2013.01); *G05D 1/0891* (2013.01); *G06Q 10/087* (2013.01); *G05D 2201/0216* (2013.01)

(58) Field of Classification Search
   CPC ......... G05D 1/0891; G05D 2201/0216; G05D 1/0088; G05D 1/021; G06Q 10/087
   See application file for complete search history.

(56) References Cited

U.S. PATENT DOCUMENTS

| | | | |
|---|---|---|---|
| 8,788,096 B1 | 7/2014 | Sokol et al. | |
| 9,087,314 B2 | 7/2015 | Hoffman et al. | |
| 2006/0210382 A1 | 9/2006 | Mountz et al. | |
| 2009/0223728 A1 | 9/2009 | Koide et al. | |
| 2010/0070132 A1 | 3/2010 | Doi et al. | |
| 2011/0130866 A1* | 6/2011 | D'Andrea | B66F 9/063 700/214 |
| 2016/0229556 A1* | 8/2016 | Zhou | B64D 47/08 |
| 2016/0303448 A1* | 10/2016 | Cornell | A63B 63/083 |

\* cited by examiner

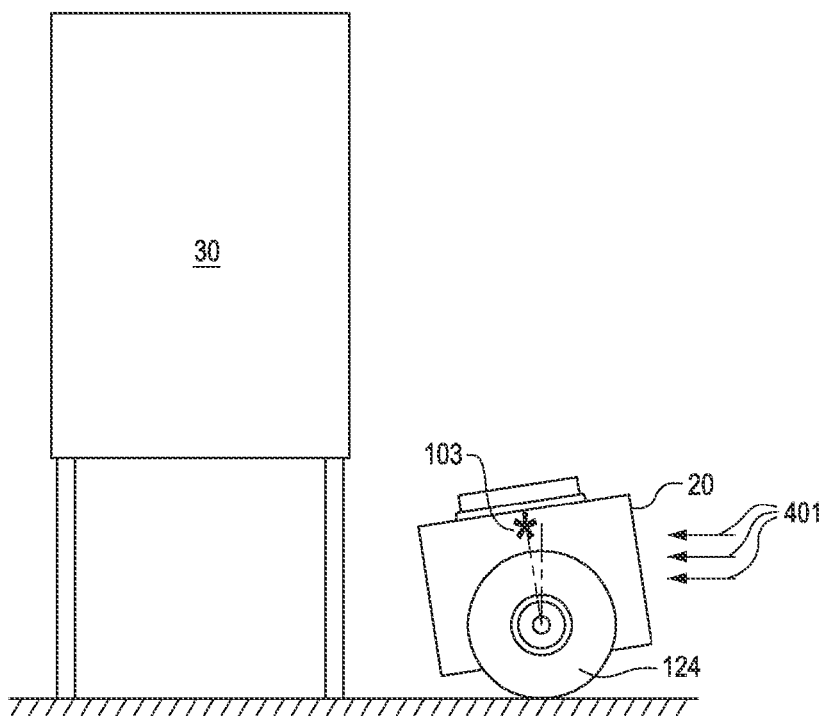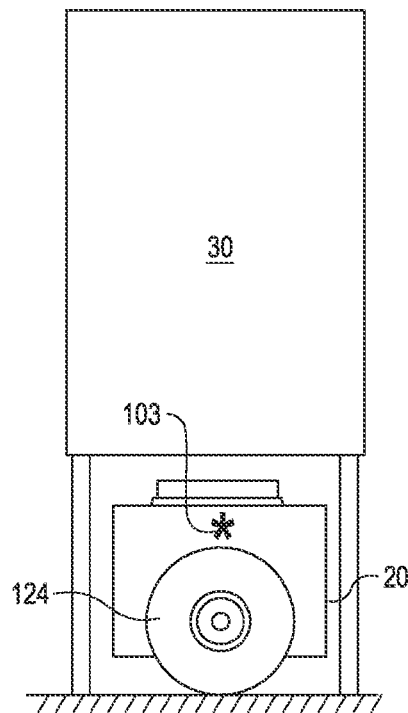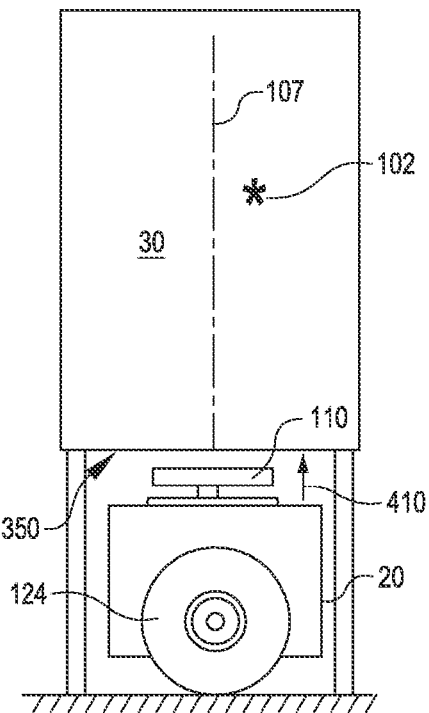

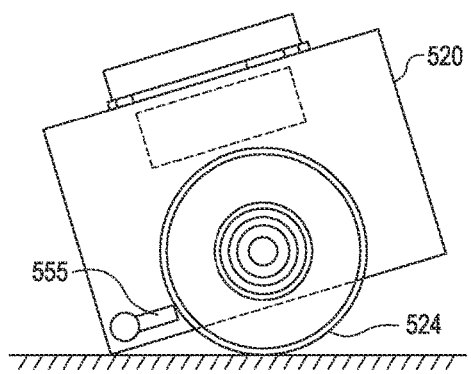
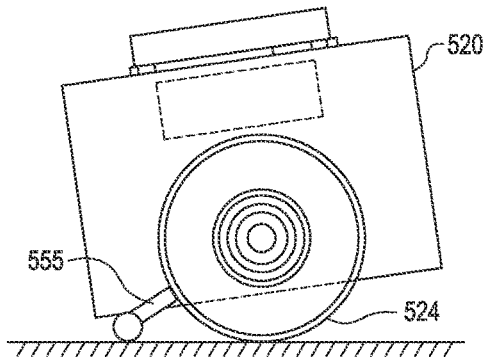
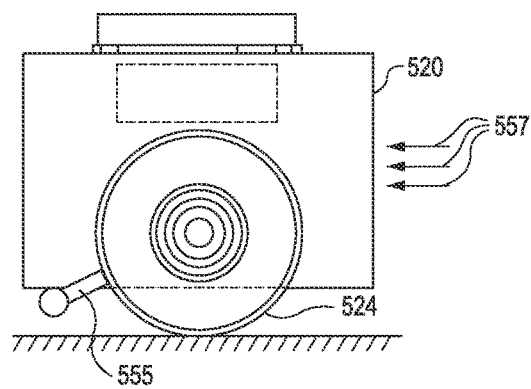
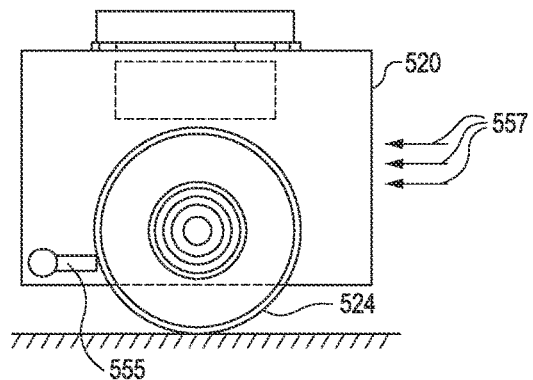
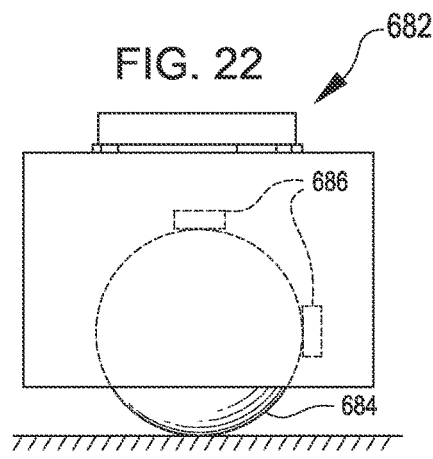

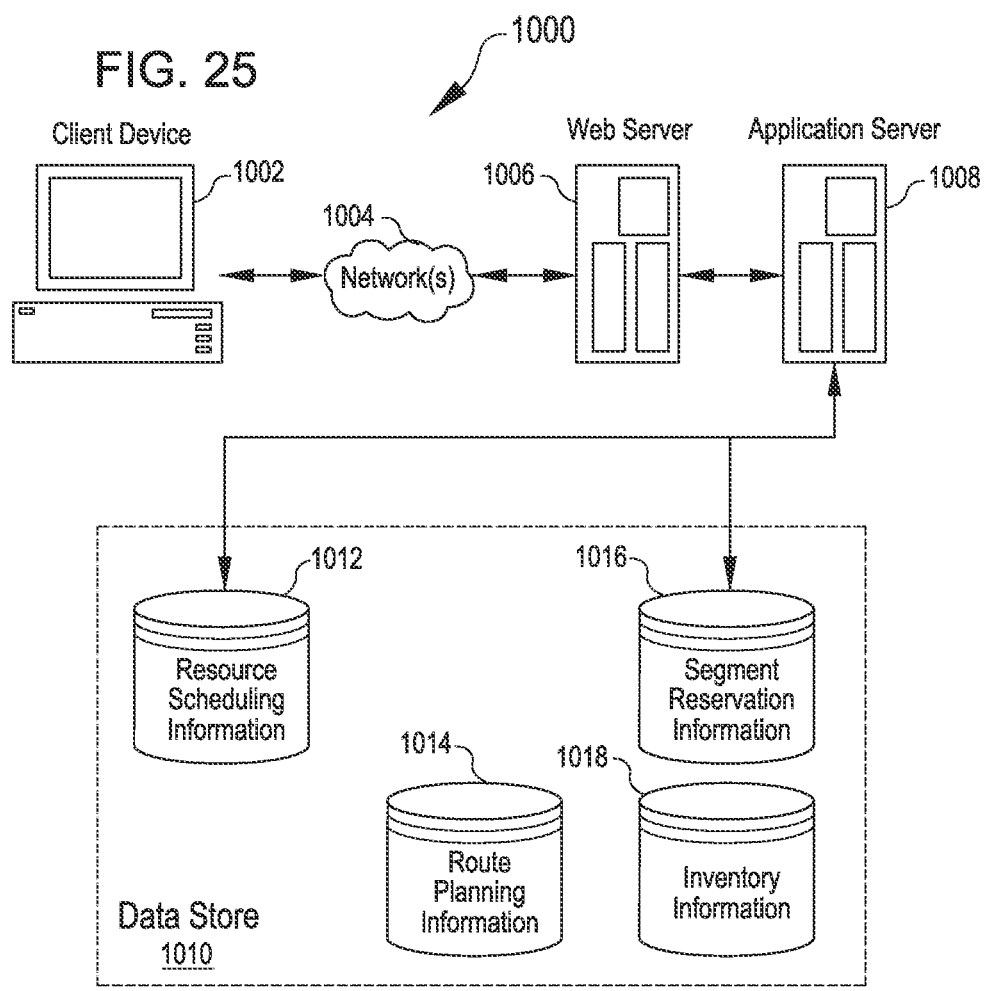

ACTIVELY BALANCED MOBILE DRIVE UNIT

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become non-trivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. Additionally, as modern inventory systems continue to increase in size and complexity, any reduction in a number and/or cost of components utilized can result in a non-trivial cost savings when multiplied across a large number of units using those components within the inventory systems.

BRIEF DESCRIPTION OF THE DRAWINGS

Various embodiments in accordance with the present disclosure will be described with reference to the drawings, in which:

FIGS. 9-17 show operation of various components of an actively-balanced mobile drive unit and an inventory holder during docking, movement and undocking according to certain embodiments;

FIGS. 18-21 illustrate a kickstand that can be utilized on a mobile drive unit in various embodiments.

FIG. 22 illustrates another example of a mobile drive unit that can be used for stable movement according to certain embodiments;

FIG. 25 illustrates an environment in which various features of the inventory system can be implemented, in accordance with at least one embodiment.

DETAILED DESCRIPTION

Figure 1:
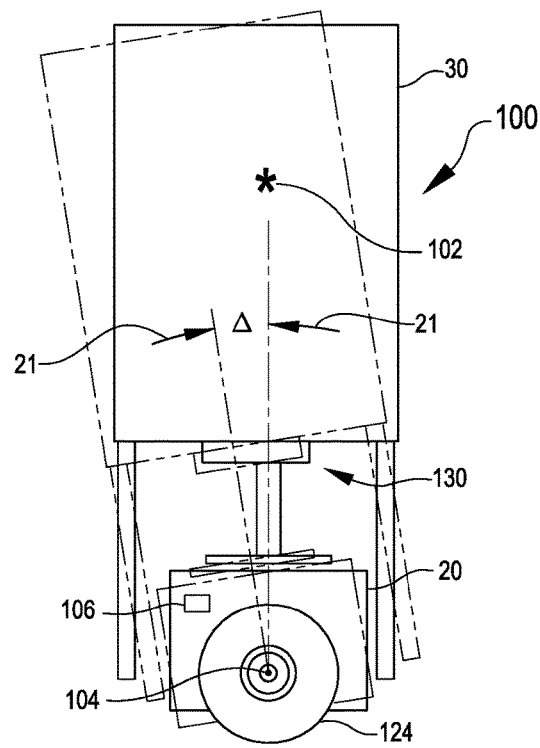
FIG. 1 illustrates an example of an inventory system that provides stable movement of inventory holders via actively balanced mobile drive units according to certain embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to an inventory system having multiple inventory holders and multiple mobile drive units for moving the inventory holders. Specific features are directed to stable movement of mobile drive units. The mobile drive units are configured to carry payloads, for example, an inventory holder (and any inventory, items, objects, containers, totes, or boxes stored therein) that the mobile drive unit has reached and lifted. The mobile drive unit accounts for characteristics of the payload and various forces acting on the payload and increases stability of the payload by changing motion parameters of elements of the mobile drive unit (e.g., driving a central pair of wheels of a mobile drive unit to bring an inventory holder carried by the mobile drive unit into a balanced state over the wheels). For example, a location of a center of gravity of the payload may be changed by adjusting the direction, velocity, and/or acceleration of wheels of the mobile drive unit carrying the inventory holder. Moving the location of the center of gravity of the payload closer to vertical alignment with a pivot point or axis of the mobile drive unit (e.g., closer to a position vertically over the axle of the mobile drive unit's wheels) may increase the stability of the payload, for example, in a stopped state. This may be because doing so balances moments acting on the payload, moving the payload toward a stopped equilibrium state. Maintaining the location of the center of gravity of the payload with respect to the pivot axis of the mobile drive unit (e.g., offset from the vertical alignment with the pivot axis that may be present in the stopped state) may maintain the stability of the payload in a travelling state. This may be because doing so balances moments acting on the payload, while moving the payload in a travelling equilibrium state. In some examples, moving the location of the center of gravity of the payload toward or away from alignment with the pivot axis can provide acceleration or motion of the payload that can facilitate transitioning the payload between stopped equilibrium and various travelling equilibrium states.

In various embodiments, the mobile drive unit includes a pivot axis, a sensing system, an inverted pendulum system, and a lifting system. The payload of the mobile drive unit can be rotatable about the pivot axis, which can permit the center of gravity of the payload to rotate about the pivot axis toward or away from a stopped equilibrium state. The stopped equilibrium state can correspond to a substantially stationary state in which moments acting on the center of gravity of the payload are balanced. For example, in the stopped equilibrium state, the center of gravity may be in a position in which the center of gravity is vertically aligned with respect to the pivot axis (e.g., vertically above the pivot axis in a stopped equilibrium state). The various travelling equilibrium states can correspond to moving states in which moments acting on the center of gravity of the payload are also balanced. For example, in the travelling equilibrium states, the center of gravity may be in a position in which the center of gravity is not moving with respect to the pivot axis (e.g., offset from the pivot axis in the travelling equilibrium states). The sensing system can include any suitable sensors for obtaining information about the payload, e.g., about the inventory holder. This information can be used, for example, to determine a location of the center of gravity of the payload and/or a current equilibrium state of the payload. The sensing system can also obtain information about a deviation of the center of gravity from any current equilibrium state. The deviation can correspond to an angular tilt from the equilibrium state and/or a rate at which the angular tilt is changing. In various scenarios, information about the mobile drive unit (e.g., a weight distribution or orientation of components of the mobile drive unit) is taken into account when determining details about the inventory holder or payload, such as details about a center of gravity, a stopped equilibrium state, a traveling equilibrium state, etc. The inverted pendulum system can include any mechanism capable of maintaining the center of gravity of the payload within a predetermined deviation from the equilibrium state. For example, the inverted pendulum system may move or translate a location of the pivot axis, e.g., to cause rotation of the center of gravity toward the current equilibrium state, or away from the current equilibrium state to facilitate movement toward a new desired equilibrium state. The lifting system can include any suitable mechanism for lifting the inventory holder relative to the mobile drive unit. In operation, the inverted pendulum system can be operated based on information from the sensing system, permitting the inverted pendulum system to appropriately respond to changes in the payload, e.g., to maintain the center of gravity of the payload within a predetermined deviation from the current equilibrium state in response to changes to characteristics of the payload, such as may occur due to lifting of the inventory holder by the lifting system or changes to the inventory contained in the inventory holder. When the mobile drive unit is not carrying an inventory holder (e.g., en route to or from an inventory holder), the sensing and the inverted pendulum systems may also be used to maintain the body of the mobile drive unit within a predetermined deviation from a body equilibrium state of the mobile drive unit, such as to keep the unloaded mobile drive unit balanced in corresponding travelling or substantially stopped states.

Turning now to the drawings, FIG. 1 illustrates an example of components of an inventory system 10 including a mobile drive unit 20 carrying an inventory holder 30. In this depicted arrangement, the inventory holder 30 constitutes a payload carried by the mobile drive unit 20. The payload has a center of gravity 102. The location of the center of gravity 102 relative to the payload may be a result, for example, of a distribution of inventory items 40 (and corresponding weight) within the inventory holder 30, as well as a weight distribution of the inventory holder itself. The location of the center of gravity 102 relative to the payload may shift. For example, such a shift may occur as a result of inventory items 40 shifting within the inventory holder 30, being added to the inventory holder 30, and/or being removed from the inventory holder 30. Such a shift may also occur as a result of other changes in the payload, e.g., due to the mobile drive unit 20 setting down (or otherwise disengaging from) a particular inventory holder 30 and/or picking up (or otherwise engaging) the same or another inventory holder 30.

The mobile drive unit 20 includes a pivot axis 104 about which the center of gravity 102 of the payload can rotate. The center of gravity 102 may rotate about the pivot axis 104 toward or away from any equilibrium state, e.g., a stopped equilibrium state. The various equilibrium states can correspond to states in which moments acting on the center of gravity 102 of the payload are balanced. For example, in the stopped equilibrium state, the center of gravity 102 may be in a position in which the center of gravity 102 is vertically aligned in a position over the pivot axis 104 as shown in solid lines in FIG. 1. The pivot axis 104 in FIG. 1 corresponds to an axis about which motorized wheels 124 of the mobile drive unit 20 rotate. The motorized wheels 124 of FIG. 1 are positioned between a front and a rear of a body of the mobile drive unit 20 and on opposite sides of the body of the mobile drive unit 20. In the depicted arrangement, the motorized wheels 124 act as a fulcrum about which the front and rear of the body of the mobile drive unit 20 can rotate, e.g., toward a support surface on which the mobile drive unit 20 navigate.

The inventory system 10 further includes a sensing system, e.g., in the mobile drive unit 20. The sensing system includes a sensor set 106 that includes one or more suitable sensors for obtaining information about the payload, e.g., the inventory holder 30. The sensor set 106 is shown in a single location in the mobile drive unit 20 in FIG. 1 so as to not obscure other features shown in FIG. 1; however, the sensor set 106 can be otherwise arranged, including, but not limited to, the arrangement described below with respect to FIGS. 6-7. Examples of different types of sensors that can be included in the sensor set 106 are also described below with respect to FIGS. 6-7. The sensor set 106 can obtain information about a deviation Δ of the position of the center of gravity 102 from the current equilibrium state (e.g., a difference between a deviated state shown in phantom lines in FIG. 1 and the stopped equilibrium state shown in solid lines in FIG. 1). The deviation Δ can correspond to an angular tilt 21 from the current equilibrium state and/or a rate at which the angular tilt 21 is changing (e.g., an angular velocity and/or an angular acceleration).

The mobile drive unit 20 further includes an inverted pendulum system. The inverted pendulum system can include any mechanism capable of maintaining the center of gravity 102 of the payload within a set deviation Δ from an equilibrium state. For example, in FIG. 1, the inverted pendulum system includes the motorized wheels 124. The motorized wheels 124 may be operated to move the mobile drive unit 20 (e.g., forward or backward), which in turn moves or translates a location of the pivot axis 104. Such movement can cause a corresponding rotation of the center of gravity 102, e.g., toward or away from the current equilibrium state. For example, in order to maintain the current equilibrium state, the motorized wheels 124 can accordingly be controlled based on information from the sensor set 106 to counteract a tilt of the center of gravity 102 from the pivot axis 104 and prevent the deviation Δ from exceeding a predetermined threshold.

The mobile drive unit 20 further includes a lifting system. The lifting system can include any suitable mechanism for lifting the inventory holder 30 relative to the mobile drive unit 20. Suitable lifting systems include, but are not limited to, the docking head assembly 130 described later herein. In some aspects, the lifting system may utilize the motorized wheels 124 to facilitate lifting of the inventory holder. For example, the lifting system may control the motorized wheels to pivot the mobile drive unit 20 in a first direction to a tilted orientation in which the mobile drive unit fits underneath the inventory holder 30 for engaging the inventory holder 30. From such a position, the lifting system may operate the motorized wheels to pivot the mobile drive unit 20 in a second (e.g., opposite) direction to lift the inventory holder 30. A lifted payload can be detected by the sensor set 106. In operation, the motorized wheels 124 can be operated based on information from the sensor set 106, permitting the motorized wheels 124 to appropriately respond to changes in the payload, e.g., to maintain the center of gravity 102 of the payload within the predetermined deviation from the current equilibrium state in response to changes to characteristics of the payload, such as may occur due to lifting of the inventory holder 30 or changes to the inventory items 40 contained in the inventory holder 30.

Figure 2:
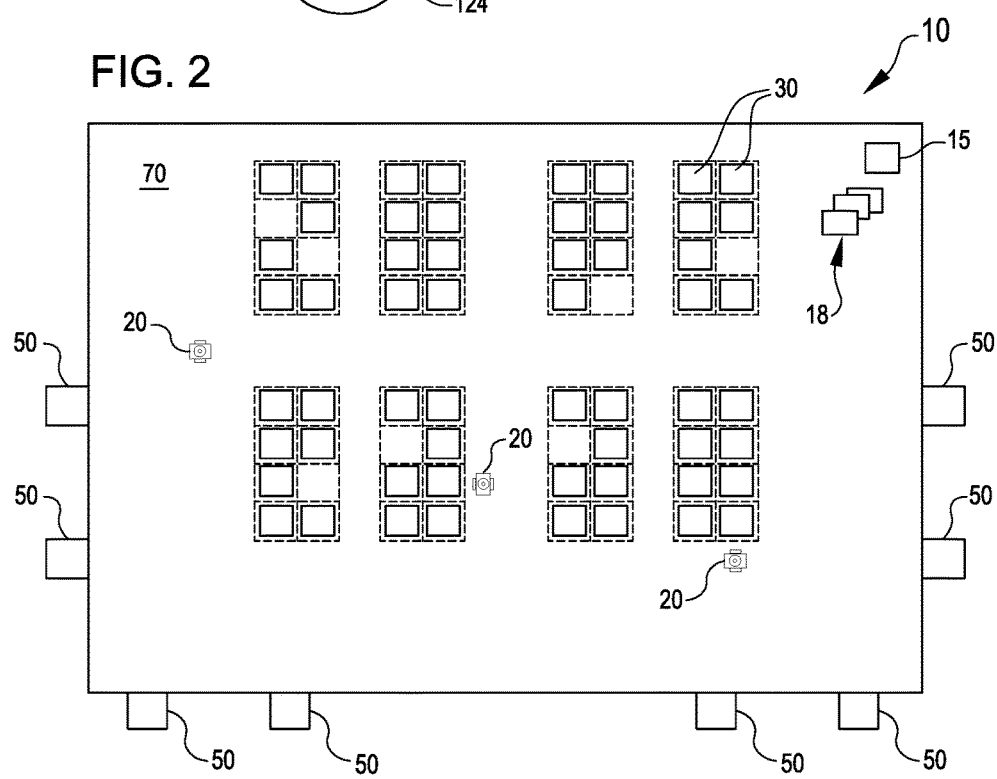
FIG. 2 illustrates components of an inventory system according to certain embodiments.

FIG. 2 illustrates the components of an inventory system 10 in which the mobile drive unit 20 may operate. Inventory system 10 includes a management module 15, one or more mobile drive units 20, one or more inventory holders 30, and one or more inventory stations 50. Mobile drive units 20 transport inventory holders 30 between points within a workspace 70 in response to commands communicated by management module 15. Each inventory holder 30 stores one or more types of inventory items. As a result, inventory system 10 is capable of moving inventory items between locations within workspace 70 to facilitate the entry, processing, and/or removal of inventory items from inventory system 10 and the completion of other tasks involving inventory items.

Management module 15 assigns tasks to appropriate components of inventory system 10 and coordinates operation of the various components in completing the tasks. These tasks may relate not only to the movement and processing of inventory items, but also to the management and maintenance of the components of inventory system 10. For example, management module 15 may assign portions of workspace 70 as parking spaces for mobile drive units 20, the scheduled recharge or replacement of mobile drive unit batteries, the storage of empty inventory holders 30, or any other operations associated with the functionality supported by inventory system 10 and its various components. Management module 15 may select components of inventory system 10 to perform these tasks and communicate appropriate commands and/or data to the selected components to facilitate completion of these operations.

Although shown in FIG. 2 as a single, discrete component, management module 15 may represent multiple components and may represent or include portions of mobile drive units 20 or other elements of inventory system 10. As a result, any or all of the interactions between a particular mobile drive unit 20 and management module 15 that are described below may, in particular embodiments, represent peer-to-peer communication between that mobile drive unit 20 and one or more other mobile drive units 20. The components and operation of an example embodiment of management module 15 are discussed further below with respect to FIG. 3.

Mobile drive units 20 move inventory holders 30 between locations within workspace 70. Mobile drive units 20 may represent any devices or components appropriate for use in inventory system 10 based on the characteristics and configuration of inventory holders 30 and/or other elements of inventory system 10. In a particular embodiment of inventory system 10, mobile drive units 20 represent independent, self-powered devices configured to freely move about workspace 70. Examples of such inventory systems are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, mobile drive units 20 represent elements of a tracked inventory system configured to move inventory holder 30 along tracks, rails, cables, crane system, or other guidance or support elements traversing workspace 70. In such an embodiment, mobile drive units 20 may receive power and/or support through a connection to the guidance elements, such as a powered rail. Additionally, in particular embodiments of inventory system 10 mobile drive units 20 may be configured to utilize alternative conveyance equipment to move within workspace 70 and/or between separate portions of workspace 70. The components and operation of an example embodiment of a mobile drive unit 20 are discussed further below with respect to FIGS. 4-7 and 9-22.

Additionally, mobile drive units 20 may be capable of communicating with management module 15 to receive information identifying selected inventory holders 30, transmit the locations of mobile drive units 20, or exchange any other suitable information to be used by management module 15 or mobile drive units 20 during operation. Mobile drive units 20 may communicate with management module 15 wirelessly, using wired connections between mobile drive units 20 and management module 15, and/or in any other appropriate manner. As one example, particular embodiments of mobile drive unit 20 may communicate with management module 15 and/or with one another using 802.11, Bluetooth, or Infrared Data Association (IrDA) standards, or any other appropriate wireless communication protocol. As another example, in a tracked inventory system 10, tracks or other guidance elements upon which mobile drive units 20 move may be wired to facilitate communication between mobile drive units 20 and other components of inventory system 10. Furthermore, as noted above, management module 15 may include components of individual mobile drive units 20. Thus, for the purposes of this description and the claims that follow, communication between management module 15 and a particular mobile drive unit 20 may represent communication between components of a particular mobile drive unit 20. In general, mobile drive units 20 may be powered, propelled, and controlled in any manner appropriate based on the configuration and characteristics of inventory system 10.

Inventory holders 30 store inventory items. In a particular embodiment, inventory holders 30 include multiple storage bins with each storage bin capable of holding one or more types of inventory items. Inventory holders 30 are capable of being carried, rolled, and/or otherwise moved by mobile drive units 20. In particular embodiments, inventory holder 30 may provide additional propulsion to supplement that provided by mobile drive unit 20 when moving inventory holder 30.

Additionally, in particular embodiments, inventory items 40 may also hang from hooks or bars (not shown) within or on inventory holder 30. In general, inventory holder 30 may store inventory items 40 in any appropriate manner within inventory holder 30 and/or on the external surface of inventory holder 30.

Additionally, each inventory holder 30 may include a plurality of faces, and each bin may be accessible through one or more faces of the inventory holder 30. For example, in a particular embodiment, inventory holder 30 includes four faces. In such an embodiment, bins located at a corner of two faces may be accessible through either of those two faces, while each of the other bins is accessible through an opening in one of the four faces. Mobile drive unit 20 may be configured to rotate inventory holder 30 at appropriate times to present a particular face and the bins associated with that face to an operator or other components of inventory system 10.

Inventory items represent any objects suitable for storage, retrieval, and/or processing in an automated inventory system 10. For the purposes of this description, "inventory items" may represent any one or more objects of a particular type that are stored in inventory system 10. Thus, a particular inventory holder 30 is currently "storing" a particular inventory item if the inventory holder 30 currently holds one or more units of that type. As one example, inventory system 10 may represent a mail order warehouse facility, and inventory items may represent merchandise stored in the warehouse facility. During operation, mobile drive units 20 may retrieve inventory holders 30 containing one or more inventory items requested in an order to be packed for delivery to a customer or inventory holders 30 carrying pallets containing aggregated collections of inventory items for shipment. Moreover, in particular embodiments of inventory system 10, boxes containing completed orders may themselves represent inventory items.

In particular embodiments, inventory system 10 may also include one or more inventory stations 50. Inventory stations 50 represent locations designated for the completion of particular tasks involving inventory items. Such tasks may include the removal of inventory items from inventory holders 30, the introduction of inventory items into inventory holders 30, the counting of inventory items in inventory holders 30, the decomposition of inventory items (e.g. from pallet- or case-sized groups to individual inventory items), the consolidation of inventory items between inventory holders 30, and/or the processing or handling of inventory items in any other suitable manner. In particular embodiments, inventory stations 50 may just represent the physical locations where a particular task involving inventory items can be completed within workspace 70. In alternative embodiments, inventory stations 50 may represent both the physical location and also any appropriate equipment for processing or handling inventory items, such as scanners for monitoring the flow of inventory items in and out of inventory system 10, communication interfaces for communicating with management module 15, and/or any other suitable components. Inventory stations 50 may be controlled, entirely or in part, by human operators or may be fully automated. Moreover, the human or automated operators of inventory stations 50 may be capable of performing certain tasks to inventory items, such as packing, counting, or transferring inventory items, as part of the operation of inventory system 10.

Workspace 70 represents an area associated with inventory system 10 in which mobile drive units 20 can move and/or inventory holders 30 can be stored. For example, workspace 70 may represent all or part of the floor of a mail-order warehouse in which inventory system 10 operates. Although FIG. 2 shows, for the purposes of illustration, an embodiment of inventory system 10 in which workspace 70 includes a fixed, predetermined, and finite physical space, particular embodiments of inventory system 10 may include mobile drive units 20 and inventory holders 30 that are configured to operate within a workspace 70 that is of variable dimensions and/or an arbitrary geometry. While FIG. 2 illustrates a particular embodiment of inventory system 10 in which workspace 70 is entirely enclosed in a building, alternative embodiments may utilize workspaces 70 in which some or all of the workspace 70 is located outdoors, within a vehicle (such as a cargo ship), or otherwise unconstrained by any fixed structure.

In operation, management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of mobile drive units 20, inventory holders 30, inventory stations 50 and other components of inventory system 10. Depending on the component and the task to be completed, a particular task assignment 18 may identify locations, components, and/or actions associated with the corresponding task and/or any other appropriate information to be used by the relevant component in completing the assigned task.

In particular embodiments, management module 15 generates task assignments 18 based, in part, on inventory requests that management module 15 receives from other components of inventory system 10 and/or from external components in communication with management module 15. These inventory requests identify particular operations to be completed involving inventory items stored or to be stored within inventory system 10 and may represent communication of any suitable form. For example, in particular embodiments, an inventory request may represent a shipping order specifying particular inventory items that have been purchased by a customer and that are to be retrieved from inventory system 10 for shipment to the customer. Management module 15 may also generate task assignments 18 independently of such inventory requests, as part of the overall management and maintenance of inventory system 10. For example, management module 15 may generate task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of inventory system 10. After generating one or more task assignments 18, management module 15 transmits the generated task assignments 18 to appropriate components for completion of the corresponding task. The relevant components then execute their assigned tasks.

With respect to mobile drive units 20 specifically, management module 15 may, in particular embodiments, communicate task assignments 18 to selected mobile drive units 20 that identify one or more destinations for the selected mobile drive units 20. Management module 15 may select a mobile drive unit 20 to assign the relevant task based on the location or state of the selected mobile drive unit 20, an indication that the selected mobile drive unit 20 has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the mobile drive unit 20 should park until receiving another task, or a location associated with any other task appropriate based on the configuration, characteristics, and/or state of inventory system 10, as a whole, or individual components of inventory system 10. For example, in particular embodiments, such decisions may be based on the popularity of particular inventory items, the staffing of a particular inventory station 50, the tasks currently assigned to a particular mobile drive unit 20, and/or any other appropriate considerations.

As part of completing these tasks mobile drive units 20 may dock with and transport inventory holders 30 within workspace 70. Mobile drive units 20 may dock with inventory holders 30 by connecting to, lifting, and/or otherwise interacting with inventory holders 30 in any other suitable manner so that, when docked, mobile drive units 20 are coupled to and/or support inventory holders 30 and can move inventory holders 30 within workspace 70. While the description below focuses on particular embodiments of mobile drive unit 20 and inventory holder 30 that are configured to dock in a particular manner, alternative embodiments of mobile drive unit 20 and inventory holder 30 may be configured to dock in any manner suitable to allow mobile drive unit 20 to move inventory holder 30 within workspace 70. Additionally, as noted below, in particular embodiments, mobile drive units 20 represent all or portions of inventory holders 30. In such embodiments, mobile drive units 20 may not dock with inventory holders 30 before transporting inventory holders 30 and/or mobile drive units 20 may each remain continually docked with a particular inventory holder 30.

While the appropriate components of inventory system 10 complete assigned tasks, management module 15 may interact with the relevant components to ensure the efficient use of space, equipment, manpower, and other resources available to inventory system 10. As one specific example of such interaction, management module 15 is responsible, in particular embodiments, for planning the paths mobile drive units 20 take when moving within workspace 70 and for allocating use of a particular portion of workspace 70 to a particular mobile drive unit 20 for purposes of completing an assigned task. In such embodiments, mobile drive units 20 may, in response to being assigned a task, request a path to a particular destination associated with the task. Moreover, while the description below focuses on one or more embodiments in which mobile drive unit 20 requests paths from management module 15, mobile drive unit 20 may, in alternative embodiments, generate its own paths.

Components of inventory system 10 may provide information to management module 15 regarding their current state, other components of inventory system 10 with which they are interacting, and/or other conditions relevant to the operation of inventory system 10. This may allow management module 15 to utilize feedback from the relevant components to update algorithm parameters, adjust policies, or otherwise modify its decision-making to respond to changes in operating conditions or the occurrence of particular events.

In addition, while management module 15 may be configured to manage various aspects of the operation of the components of inventory system 10, in particular embodiments, the components themselves may also be responsible for decision-making relating to certain aspects of their operation, thereby reducing the processing load on management module 15.

Thus, based on its knowledge of the location, current state, and/or other characteristics of the various components of inventory system 10 and an awareness of all the tasks currently being completed, management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 10 may be able to support a number of techniques for efficiently executing various aspects of the operation of inventory system 10. As a result, particular embodiments of management module 15 may, by implementing one or more management techniques described below, enhance the efficiency of inventory system 10 and/or provide other operational benefits.

Figure 3:
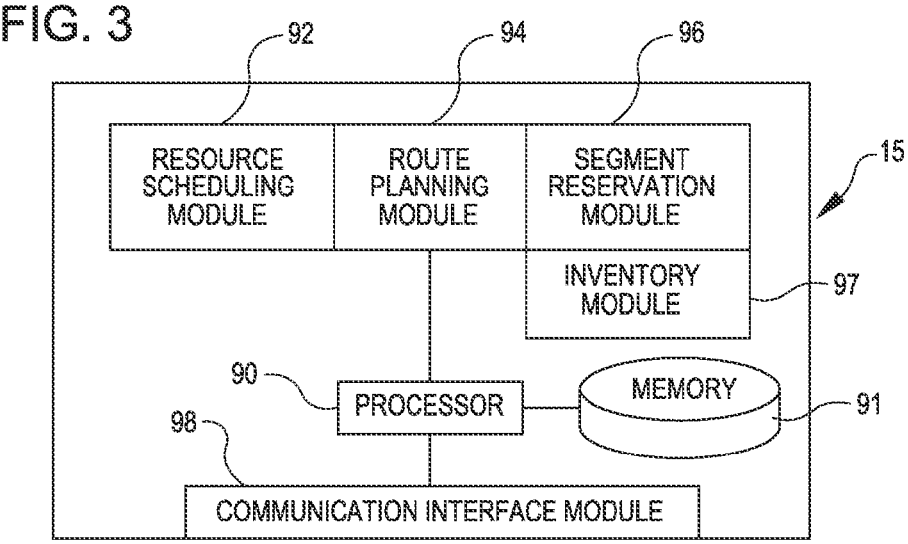
FIG. 3 illustrates in greater detail the components of an example management module that may be utilized in particular embodiments of the inventory system shown in FIG. 2.

FIG. 3 illustrates in greater detail the components of a particular embodiment of management module 15. As shown, the example embodiment includes a resource scheduling module 92, a route planning module 94, a segment reservation module 96, an inventory module 97, a communication interface module 98, a processor 90, and a memory 91. Management module 15 may represent a single component, multiple components located at a central location within inventory system 10, or multiple components distributed throughout inventory system 10. For example, management module 15 may represent components of one or more mobile drive units 20 that are capable of communicating information between the mobile drive units 20 and coordinating the movement of mobile drive units 20 within workspace 70. In general, management module 15 may include any appropriate combination of hardware and/or software suitable to provide the described functionality.

Processor 90 is operable to execute instructions associated with the functionality provided by management module 15. Processor 90 may comprise one or more general purpose computers, dedicated microprocessors, or other processing devices capable of communicating electronic information. Examples of processor 90 include one or more application-specific integrated circuits (ASICs), field programmable gate arrays (FPGAs), digital signal processors (DSPs) and any other suitable specific or general purpose processors.

Memory 91 stores processor instructions, inventory requests, reservation information, state information for the various components of inventory system 10 and/or any other appropriate values, parameters, or information utilized by management module 15 during operation. Memory 91 may represent any collection and arrangement of volatile or nonvolatile, local or remote devices suitable for storing data. Examples of memory 91 include, but are not limited to, random access memory (RAM) devices, read only memory (ROM) devices, magnetic storage devices, optical storage devices or any other suitable data storage devices.

Resource scheduling module 92 processes received inventory requests and generates one or more assigned tasks to be completed by the components of inventory system 10. Resource scheduling module 92 may also select one or more appropriate components for completing the assigned tasks and, using communication interface module 98, communicate the assigned tasks to the relevant components. Additionally, resource scheduling module 92 may also be responsible for generating assigned tasks associated with various management operations, such as prompting mobile drive units 20 to recharge batteries or have batteries replaced, instructing inactive mobile drive units 20 to park in a location outside the anticipated traffic flow or a location near the anticipated site of future tasks, and/or directing mobile drive units 20 selected for repair or maintenance to move towards a designated maintenance station.

Route planning module 94 receives route requests from mobile drive units 20. These route requests identify one or more destinations associated with a task the requesting mobile drive unit 20 is executing. In response to receiving a route request, route planning module 94 generates a path to one or more destinations identified in the route request. Route planning module 94 may implement any appropriate algorithms utilizing any appropriate parameters, factors, and/or considerations to determine the appropriate path. After generating an appropriate path, route planning module 94 transmits a route response identifying the generated path to the requesting mobile drive unit 20 using communication interface module 98.

Segment reservation module 96 receives reservation requests from mobile drive units 20 attempting to move along paths generated by route planning module 94. These reservation requests request the use of a particular portion of workspace 70 (referred to herein as a "segment") to allow the requesting mobile drive unit 20 to avoid collisions with other mobile drive units 20 while moving across the reserved segment. In response to received reservation requests, segment reservation module 96 transmits a reservation response granting or denying the reservation request to the requesting mobile drive unit 20 using the communication interface module 98.

The inventory module 97 maintains information about the location and number of inventory items 40 in the inventory system 10. Information can be maintained about the number of inventory items 40 in a particular inventory holder 30, and the maintained information can include the location of those inventory items 40 in the inventory holder 30. The inventory module 97 can also communicate with the mobile drive units 20, utilizing task assignments 18 to maintain, replenish or move inventory items 40 within the inventory system 10.

Communication interface module 98 facilitates communication between management module 15 and other components of inventory system 10, including reservation responses, reservation requests, route requests, route responses, and task assignments. These reservation responses, reservation requests, route requests, route responses, and task assignments may represent communication of any form appropriate based on the capabilities of management module 15 and may include any suitable information. Depending on the configuration of management module 15, communication interface module 98 may be responsible for facilitating either or both of wired and wireless communication between management module 15 and the various components of inventory system 10. In particular embodiments, management module 15 may communicate using communication protocols such as 802.11, Bluetooth, or Infrared Data Association (IrDA) standards. Furthermore, management module 15 may, in particular embodiments, represent a portion of mobile drive unit 20 or other components of inventory system 10. In such embodiments, communication interface module 98 may facilitate communication between management module 15 and other parts of the same system component.

In general, resource scheduling module 92, route planning module 94, segment reservation module 96, inventory module 97, and communication interface module 98 may each represent any appropriate hardware and/or software suitable to provide the described functionality. In addition, as noted above, management module 15 may, in particular embodiments, represent multiple different discrete components and any or all of resource scheduling module 92, route planning module 94, segment reservation module 96, inventory module 97, and communication interface module 98 may represent components physically separate from the remaining elements of management module 15. Moreover, any two or more of resource scheduling module 92, route planning module 94, segment reservation module 96, inventory module 97, and communication interface module 98 may share common components. For example, in particular embodiments, resource scheduling module 92, route planning module 94, segment reservation module 96, and inventory module 97 represent computer processes executing on processor 90 and communication interface module 98 comprises a wireless transmitter, a wireless receiver, and a related computer process executing on processor 90.

Figure 4:
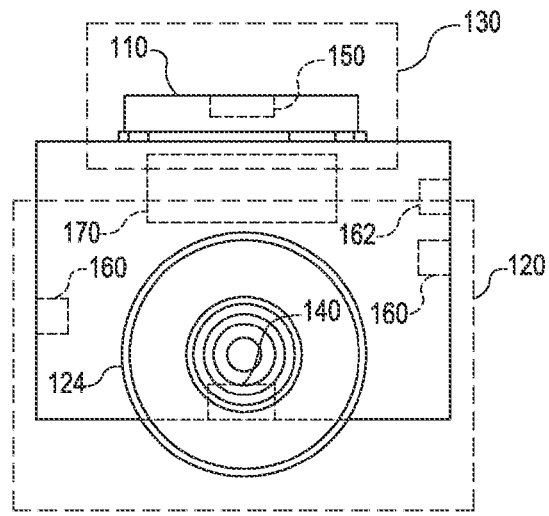
FIGS. 4 and 5 illustrate in greater detail an example of a mobile drive unit that may be utilized in particular embodiments of the inventory system shown in FIG. 2.
Figure 5:
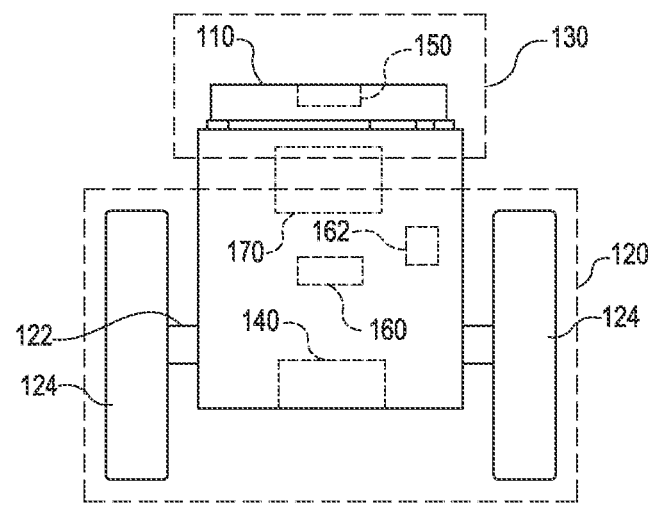

FIGS. 4 and 5 illustrate in greater detail the components of a particular embodiment of mobile drive unit 20. In particular, FIGS. 4 and 5 include a front and side view of an example mobile drive unit 20. Mobile drive unit 20 includes a docking head 110, a drive module 120, a docking actuator 130, and a control module 170. Additionally, mobile drive unit 20 may include one or more sensors configured to detect or determine the location of mobile drive unit 20, inventory holder 30, and/or other appropriate elements of inventory system 10. In the illustrated embodiment, mobile drive unit 20 includes a position sensor 140, a holder sensor 150, an obstacle sensor 160, and an identification signal transmitter 162.

Docking head 110, in particular embodiments of mobile drive unit 20, couples mobile drive unit 20 to inventory holder 30 and/or supports inventory holder 30 when mobile drive unit 20 is docked to inventory holder 30. Docking head 110 may additionally allow mobile drive unit 20 to maneuver inventory holder 30, such as by lifting inventory holder 30, propelling inventory holder 30, rotating inventory holder 30, and/or moving inventory holder 30 in any other appropriate manner. Docking head 110 may also include any appropriate combination of components, such as ribs, spikes, and/or corrugations, to facilitate such manipulation of inventory holder 30. For example, in particular embodiments, docking head 110 may include a high-friction portion that abuts a portion of inventory holder 30 while mobile drive unit 20 is docked to inventory holder 30. In such embodiments, frictional forces created between the high-friction portion of docking head 110 and a surface of inventory holder 30 may induce translational and rotational movement in inventory holder 30 when docking head 110 moves and rotates, respectively. As a result, mobile drive unit 20 may be able to manipulate inventory holder 30 by moving or rotating docking head 110, either independently or as a part of the movement of mobile drive unit 20 as a whole.

Drive module 120 propels mobile drive unit 20 and, when mobile drive unit 20 and inventory holder 30 are docked, inventory holder 30. Drive module 120 may represent any appropriate collection of components operable to propel mobile drive unit 20. For example, in the illustrated embodiment, drive module 120 includes motorized axle 122 and a pair of motorized wheels 124. One motorized wheel 124 is located at each end of motorized axle 122.

Docking actuator 130 moves docking head 110 towards inventory holder 30 to facilitate docking of mobile drive unit 20 and inventory holder 30. Docking actuator 130 may also be capable of adjusting the position or orientation of docking head 110 in other suitable manners to facilitate docking. Docking actuator 130 may include any appropriate components, based on the configuration of mobile drive unit 20 and inventory holder 30, for moving docking head 110 or otherwise adjusting the position or orientation of docking head 110. For example, in the illustrated embodiment, docking actuator 130 includes a motorized shaft (not shown) attached to the center of docking head 110. The motorized shaft is operable to lift docking head 110 as appropriate for docking with inventory holder 30.

Drive module 120 may be configured to propel mobile drive unit 20 in any appropriate manner. For example, in the illustrated embodiment, motorized wheels 124 are operable to rotate in a first direction to propel mobile drive unit 20 in a forward direction. Motorized wheels 124 are also operable to rotate in a second direction to propel mobile drive unit 20 in a backward direction. In the illustrated embodiment, drive module 120 is also configured to rotate mobile drive unit 20 by rotating motorized wheels 124 in different directions from one another or by rotating motorized wheels 124 at different speeds from one another.

Position sensor 140 represents one or more sensors, detectors, or other components suitable for determining the location of mobile drive unit 20 in any appropriate manner. For example, in particular embodiments, the workspace 70 associated with inventory system 10 includes a number of fiducial marks that mark points on a two-dimensional grid that covers all or a portion of workspace 70. In such embodiments, position sensor 140 may include a camera and suitable image- and/or video-processing components, such as an appropriately-programmed digital signal processor, to allow position sensor 140 to detect fiducial marks within the camera's field of view. Control module 170 may store location information that position sensor 140 updates as position sensor 140 detects fiducial marks. As a result, position sensor 140 may utilize fiducial marks to maintain an accurate indication of the location mobile drive unit 20 and to aid in navigation when moving within workspace 70.

Holder sensor 150 represents one or more sensors, detectors, or other components suitable for detecting inventory holder 30 and/or determining, in any appropriate manner, the location of inventory holder 30, as an absolute location or as a position relative to mobile drive unit 20. Holder sensor 150 may be capable of detecting the location of a particular portion of inventory holder 30 or inventory holder 30 as a whole. Mobile drive unit 20 may then use the detected information for docking with or otherwise interacting with inventory holder 30.

Obstacle sensor 160 represents one or more sensors capable of detecting objects located in one or more different directions in which mobile drive unit 20 is capable of moving. Obstacle sensor 160 may utilize any appropriate components and techniques, including optical, radar, sonar, pressure-sensing and/or other types of detection devices appropriate to detect objects located in the direction of travel of mobile drive unit 20. In particular embodiments, obstacle sensor 160 may transmit information describing objects it detects to control module 170 to be used by control module 170 to identify obstacles and to take appropriate remedial actions to prevent mobile drive unit 20 from colliding with obstacles and/or other objects.

Obstacle sensor 160 may also detect signals transmitted by other mobile drive units 20 operating in the vicinity of the illustrated mobile drive unit 20. For example, in particular embodiments of inventory system 10, one or more mobile drive units 20 may include an identification signal transmitter 162 that transmits a drive identification signal. The drive identification signal indicates to other mobile drive units 20 that the object transmitting the drive identification signal is in fact a mobile drive unit. Identification signal transmitter 162 may be capable of transmitting infrared, ultraviolet, audio, visible light, radio, and/or other suitable signals that indicate to recipients that the transmitting device is a mobile drive unit 20.

Additionally, in particular embodiments, obstacle sensor 160 may also be capable of detecting state information transmitted by other mobile drive units 20. For example, in particular embodiments, identification signal transmitter 162 may be capable of including state information relating to mobile drive unit 20 in the transmitted identification signal. This state information may include, but is not limited to, the position, velocity, direction, and the braking capabilities of the transmitting mobile drive unit 20. In particular embodiments, mobile drive unit 20 may use the state information transmitted by other mobile drive units to avoid collisions when operating in close proximity with those other mobile drive units.

Control module 170 monitors and % or controls operation of drive module 120 and docking actuator 130. Control module 170 may also receive information from sensors such as position sensor 140 and holder sensor 150 and adjust the operation of drive module 120, docking actuator 130, and/or other components of mobile drive unit 20 based on this information. Additionally, in particular embodiments, mobile drive unit 20 may be configured to communicate with a management device of inventory system 10 and control module 170 may receive commands transmitted to mobile drive unit 20 and communicate information back to the management device utilizing appropriate communication components of mobile drive unit 20. Control module 170 may include any appropriate hardware and/or software suitable to provide the described functionality. In particular embodiments, control module 170 includes a general-purpose microprocessor programmed to provide the described functionality. Additionally, control module 170 may include all or portions of docking actuator 130, drive module 120, position sensor 140, and/or holder sensor 150, and/or share components with any of these elements of mobile drive unit 20.

Moreover, in particular embodiments, control module 170 may include hardware and software located in components that are physically distinct from the device that houses drive module 120, docking actuator 130, and/or the other components of mobile drive unit 20 described above. For example, in particular embodiments, each mobile drive unit 20 operating in inventory system 10 may be associated with a software process (referred to here as a "drive agent") operating on a server that is in communication with the device that houses drive module 120, docking actuator 130, and other appropriate components of mobile drive unit 20. This drive agent may be responsible for requesting and receiving tasks, requesting and receiving routes, transmitting state information associated with mobile drive unit 20, and/or otherwise interacting with management module 15 and other components of inventory system 10 on behalf of the device that physically houses drive module 120, docking actuator 130, and the other appropriate components of mobile drive unit 20. As a result, for the purposes of this description and the claims that follow, the term "mobile drive unit" includes software and/or hardware, such as agent processes, that provides the described functionality on behalf of mobile drive unit 20 but that may be located in physically distinct devices from the drive module 120, docking actuator 130, and/or the other components of mobile drive unit 20 described above.

While FIGS. 4 and 5 illustrate a particular embodiment of mobile drive unit 20 containing certain components and configured to operate in a particular manner, mobile drive unit 20 may represent any appropriate component and/or collection of components configured to transport and/or facilitate the transport of inventory holders 30.

Furthermore, in particular embodiments, mobile drive unit 20 may represent all or a portion of inventory holder 30. Inventory holder 30 may include motorized wheels or any other components suitable to allow inventory holder 30 to propel itself. As one specific example, a portion of inventory holder 30 may be responsive to magnetic fields. Inventory system 10 may be able to generate one or more controlled magnetic fields capable of propelling, maneuvering and/or otherwise controlling the position of inventory holder 30 as a result of the responsive portion of inventory holder 30. In such embodiments, mobile drive unit 20 may represent the responsive portion of inventory holder 30 and/or the components of inventory system 10 responsible for generating and controlling these magnetic fields. While this description provides several specific examples, mobile drive unit 20 may, in general, represent any appropriate component and/or collection of components configured to transport and/or facilitate the transport of inventory holders 30.

Figure 6:
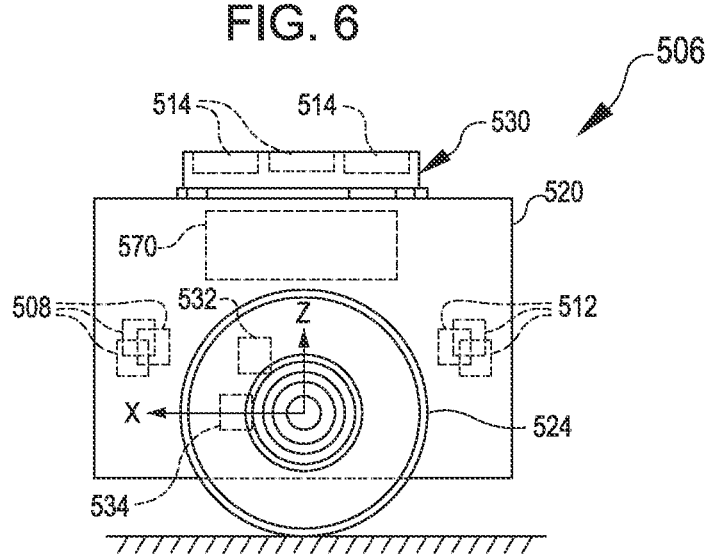
FIGS. 6 and 7 illustrate an example of a mobile drive unit with an example of an arrangement of a sensor set that can be used to facilitate stable movement according to certain embodiments.
Figure 7:
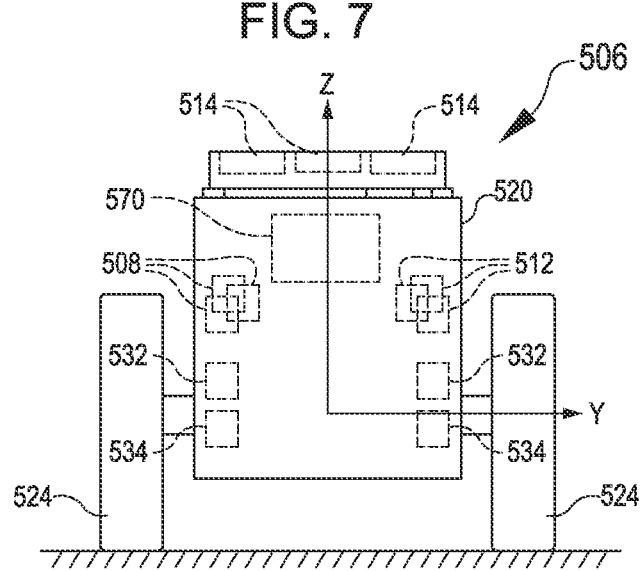

As described above, embodiments herein are directed to stable movement of mobile drive units, such as the mobile drive units 20 of FIG. 1. FIGS. 6 and 7 illustrate an example of a mobile drive unit 520 with an example of an arrangement of a sensor set 506. The sensor set 506 is an example of the sensor set 106 of FIG. 1, and other features described with respect to FIGS. 6 and 7 can likewise be examples of other features described herein that share the same names. For example, control system 570 is an example of the control system 170. Additionally, the mobile drive unit 520 can include any of the features described above with respect to FIGS. 4 and 5, although various of such features are omitted from FIGS. 6 and 7 so as to not obscure the features shown in FIGS. 6 and 7. In some embodiments, some features shown in FIGS. 4 and 5 may be omitted and other features may provide corresponding functions. In various embodiments, the motorized wheels 524 can be operated as part of an inverted pendulum system to provide stabilization for the mobile drive unit 520. Such an arrangement may reduce costs, weight, and/or physical limitations by eliminating suspension systems and associated components such as stabilizing wheels (which are typically provided at each end of conventional mobile drive units, e.g., to the front and rear of motorized wheels such as motorized wheels 524).

In FIGS. 6-7, the sensor set 506 includes rate gyroscopes 508, accelerometers 512, weight sensors 514, motor torque sensors 532, and motor velocity sensors 534. The sensor set 506 can be used as inputs to gather information that can be used to determine motion attributes (such as position, orientation, velocity, and/or acceleration) of the payload of the mobile drive unit 520 and/or constituent elements thereof. For example, motion attributes of the drive unit 520 and/or payload may be determined relative to axes defined relative to the drive unit 520 (e.g., the axes shown in FIG. 6-7, which include an x-axis oriented toward a front of the drive unit, a y-axis oriented toward a side of the drive unit 520, and an z-axis oriented toward a top of the drive unit 520) or any other relevant axes and/or points of reference.

The rate gyroscopes 508 individually or collectively can provide information about changes in direction of the mobile drive unit 520 and/or payload. For example, this information may indicate changes (e.g., angular velocity and/or angular acceleration) in pitch, yaw, and/or roll (e.g., rotation respectively about the y-axis, z-axis, and x-axis illustrated in FIGS. 6-7). In some embodiments, change in pitch (e.g., rotation about the y-axis) can be indicative of whether the mobile drive unit 520 and/or payload is falling over or otherwise deviating from a current equilibrium state, such as if a front or rear of the body of the mobile drive unit 520 is moving toward a support surface on which the mobile drive unit travels. In some embodiments, change in yaw (e.g., rotation about the z-axis) can be indicative of an amount of turning performed by the mobile drive unit 520. In some embodiments, change in roll (e.g., rotation about the x-axis) can be indicative of whether the mobile drive unit 520 and/or payload is falling over or otherwise deviating from a current equilibrium state, such as if one or the other lateral side of the body of the mobile drive unit 520 is moving toward a support surface on which the mobile drive unit travels, or if one of a pair of motorized wheels has lifted off of the support surface. Although three rate gyroscopes 508 are illustrated, in some embodiments, more or fewer rate gyroscopes 508 may be included. For example, in some embodiments, one rate gyroscope 508 is included for each degree of freedom desired in the data from the sensor set 506.

The accelerometers 512 individually or collectively can provide information about changes in acceleration acting on the mobile drive unit 520 and/or payload. For example, this information may indicate changes in acceleration along axes (e.g., along the y-axis, z-axis, and x-axis illustrated in FIGS. 6-7). In some embodiments, acceleration along the x-axis and/or z-axis may be indicative of whether the center of gravity 102 (FIG. 1) of the payload is moving with respect to a pivot line 104, which may be useful in determining and/or responding to an amount of tilt, a change of tilt, or other variation in a deviation $\Delta$ from an equilibrium position. For example, data from one or more of the accelerometers 512 (FIGS. 6-7) may be used to determine whether or not the inventory holder 30 is upright relative to the mobile drive unit 520. Although three accelerometers 512 are illustrated, in some embodiments, more or fewer accelerometers 512 may be included. For example, in some embodiments, one accelerometer 512 is included for each degree of freedom desired in the data from the sensor set 506.

Although the accelerometers 512 and rate gyroscopes 508 are illustrated at opposite ends of the mobile drive unit 520 in FIGS. 6 and 7, other arrangements are possible in other embodiments. For example, in some embodiments, one or more accelerometers 512 and one or more rate gyroscopes 508 may be part of a common assembly, such as an inertial measurement unit, which may include any suitable number of these components and/or other components (e.g., magnetometers) to provide the functions described herein.

The sensor set 506 can also include sensors that obtain information useful in determining characteristics of an inventory holder 30, such as in a payload of the mobile drive unit 520. For example, weight sensors 514 may be positioned within a docking head 530 of the mobile drive unit 520. The weight sensors 514 may be spread out across the docking head 530 or otherwise arranged so as to provide information about an inventory holder 30, such as when the mobile drive unit 520 is docked. For example, a sum of measurements from the weight sensors 514 can provide an indication of the combined or total weight or mass of the inventory holder 30. A position of a center of gravity of the inventory holder 30 (and/or a position of the center of gravity 102 of the overall payload) within a plane (e.g., a plane defined by the x-axis and y-axis shown in FIGS. 6-7) can be determined based on differences or distributions in measurements obtained from the weight sensors 514. An offset of the position of the center of gravity of the inventory holder 30 (and/or of the position of the center of gravity 102 of the overall payload) from the plane (e.g., vertically along the z-axis) can be determined, for example, based on responses from the sensor set 506 to known acceleration of the mobile drive unit 520. Additionally, the weight sensors 514 may be useful in determining if the inventory holder 30 is making intermittent contact with the mobile drive unit 520 and/or has fallen off or otherwise disengaged from the mobile drive unit 520. Suitable examples of weight sensors include, but are not limited to load cells and strain gauges.

The motor torque sensors 532 and/or the motor velocity sensors 534 can provide information about motors that drive the motorized wheels 524. For example, in some embodiments either or both of these types of sensors may provide a point of reference for determining an operating condition of the motorized wheels 524. This point of reference can be used to determine how operation of the motorized wheels 524 can be changed to obtain a desired response for the center of gravity 102 of the payload. In various embodiments (e.g., as may best be appreciated with reference to FIG. 7), each motorized wheel 124 can include a corresponding motor torque sensor 532 and/or a motor velocity sensor 534. Such an arrangement may provide information useful in situations in which the motorized wheels 124 are operated independently from one another.

The motor torque sensor 532 may correspond to a transducer that converts a torsional mechanical input into an electrical output signal, a component that measures an amount of voltage or other electrical variable provided to the motor, and/or any other sensor capable of providing an indication of an amount of torque provided by the motor. The motor velocity sensor 534 can correspond to an encoder configured to optically detect indicia on a shaft of the motor and/or any other type of sensor for determining a progress of the motorized wheels 524 in operation. The motor velocity sensor 534 may provide an indication of a location of the drive unit 524 within a course of moving from one location to another, for example within the inventory system 10.

Additionally, although the sensor set 506 is depicted in FIGS. 6-7 as including sensors on or in the mobile drive unit 520, in some embodiments, one or more of the sensors of the sensor set 506 may be located remote from the mobile drive unit 520. Additionally, although certain sensors of the sensor set 506 have been described for providing particular functions, in alternate embodiments, others of the described sensors (and/or different sensors substituted for the described sensors) can be utilized to provide the described functions.

Figure 8:
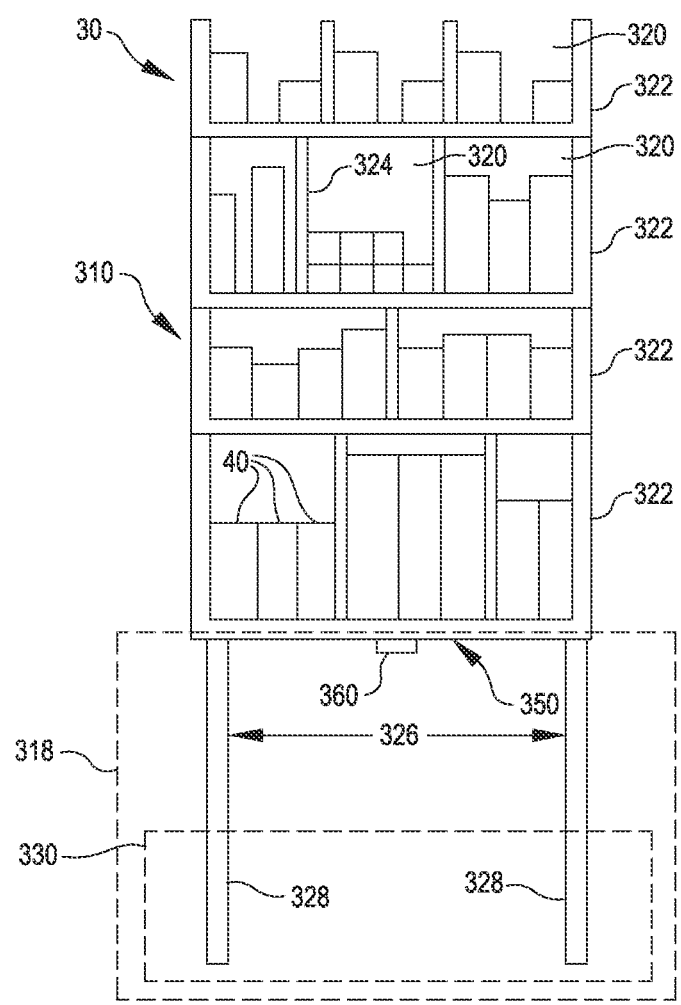
FIG. 8 illustrates in greater detail an example inventory holder that may be utilized in particular embodiments of the inventory system shown in FIG. 2.

FIG. 8 illustrates in greater detail the components of a particular embodiment of inventory holder 30. In particular, FIG. 8 illustrates the structure and contents of one side of an example inventory holder 30. In a particular embodiment, inventory holder 30 may comprise any number of faces with similar or different structure. As illustrated, inventory holder 30 includes a frame 310, a plurality of legs 328, and a docking surface 350.

Frame 310 holds inventory items 40. Frame 310 provides storage space for storing inventory items 40 external or internal to frame 310. The storage space provided by frame 310 may be divided into a plurality of inventory bins 320, each capable of holding inventory items 40. Inventory bins 320 may include any appropriate storage elements, such as bins, compartments, or hooks.

In a particular embodiment, frame 310 is composed of a plurality of trays 322 stacked upon one another and attached to or stacked on a base 318. In such an embodiment, inventory bins 320 may be formed by a plurality of adjustable dividers 324 that may be moved to resize one or more inventory bins 320. In alternative embodiments, frame 310 may represent a single inventory bin 320 that includes a single tray 322 and no adjustable dividers 324. Additionally, in particular embodiments, frame 310 may represent a load-bearing surface mounted on mobility element 330. Inventory items 40 may be stored on such an inventory holder 30 by being placed on frame 310. In general, frame 310 may include internal and/or external storage space divided into any appropriate number of inventory bins 320 in any appropriate manner.

Additionally, in a particular embodiment, frame 310 may include a plurality of device openings 326 that allow mobile drive unit 20 to position docking head 110 adjacent docking surface 350. The size, shape, and placement of device openings 326 may be determined based on the size, the shape, and other characteristics of the particular embodiment of mobile drive unit 20 and/or inventory holder 30 utilized by inventory system 10. For example, in the illustrated embodiment, frame 310 includes four legs 328 that form device openings 326 and allow mobile drive unit 20 to position mobile drive unit 20 under frame 310 and adjacent to docking surface 350. The length of legs 328 may be determined based on a height of mobile drive unit 20.

Docking surface 350 comprises a portion of inventory holder 30 that couples to, abuts, and/or rests upon a portion of docking head 110, when mobile drive unit 20 is docked to inventory holder 30. Additionally, docking surface 350 supports a portion or all of the weight of inventory holder 30 while inventory holder 30 is docked with mobile drive unit 20. The composition, shape, and/or texture of docking surface 350 may be designed to facilitate maneuvering of inventory holder 30 by mobile drive unit 20. For example, as noted above, in particular embodiments, docking surface 350 may comprise a high-friction portion. When mobile drive unit 20 and inventory holder 30 are docked, frictional forces induced between docking head 110 and this high-friction portion may allow mobile drive unit 20 to maneuver inventory holder 30. Additionally, in particular embodiments, docking surface 350 may include appropriate components suitable to receive a portion of docking head 110, couple inventory holder 30 to mobile drive unit 20, and/or facilitate control of inventory holder 30 by mobile drive unit 20.

Holder identifier 360 marks a predetermined portion of inventory holder 30 and mobile drive unit 20 may use holder identifier 360 to align with inventory holder 30 during docking and/or to determine the location of inventory holder 30. More specifically, in particular embodiments, mobile drive unit 20 may be equipped with components, such as holder sensor 150, that can detect holder identifier 360 and determine its location relative to mobile drive unit 20. As a result, mobile drive unit 20 may be able to determine the location of inventory holder 30 as a whole. For example, in particular embodiments, holder identifier 360 may represent a reflective marker that is positioned at a predetermined location on inventory holder 30 and that holder sensor 150 can optically detect using an appropriately-configured camera.

Depending on the configuration and characteristics of mobile drive unit 20 and inventory system 10, mobile drive unit 20 may move inventory holder 30 using a variety of appropriate methods. In a particular embodiment, mobile drive unit 20 is capable of moving inventory holder 30 along a two-dimensional grid, combining movement along straight-line segments with ninety-degree rotations and arcing paths to transport inventory holder 30 from the first location to the second location. Additionally, while moving, mobile drive unit 20 may use fixed objects located in the workspace as reference points to assist in navigation. For example, in particular embodiments, inventory system 10 includes multiple fiducial marks. Mobile drive unit 20 may be configured to detect fiducial marks and to determine the location of mobile drive unit 20 and/or measure its movement based on the detection of fiducial marks.

After mobile drive unit 20 arrives at the second location, mobile drive unit 20 may perform appropriate operations to facilitate access to inventory items 40 stored in inventory holder 30. For example, mobile drive unit 20 may rotate inventory holder 30 to present a particular face of inventory holder 30 to an operator of inventory system 10 or other suitable party, such as a packer selecting inventory items 40 from inventory holder 30. Mobile drive unit 20 may also undock from inventory holder 30. Alternatively, instead of undocking at the second location, mobile drive unit 20 may transport inventory holder 30 back to the first location or to a third location after any appropriate actions have been taken involving inventory items 40. For example, after a packer has removed particular inventory items 40 from inventory holder 30, mobile drive unit 20 may return inventory holder 30 to its original storage location, a new storage location, or another inventory station. Mobile drive unit 20 may then undock from inventory holder 30 at this new location.

FIGS. 9-17 illustrate operation of particular embodiments of an actively-balanced mobile drive unit 20 and inventory holder 30 during docking, movement, and undocking.

FIG. 9 illustrates a mobile drive unit 20 and inventory holder 30 prior to docking. As noted above with respect to FIG. 2, mobile drive unit 20 may receive a command that identifies a location for a particular inventory holder 30. Mobile drive unit 20 may then move (e.g., as illustrated by arrows 401) to the location specified in the command. For example, the mobile drive unit 20 is illustrated in a tilted, travelling equilibrium state in which moments acting on the mobile drive unit 20 (e.g., due to a weight distribution of components of the mobile drive unit 20 and acceleration experienced by the mobile drive unit 20) are suitably balanced so that rotation of the wheels 124 move the mobile drive unit 20 toward the specified location. Although a center of gravity 103 of the mobile drive unit 20 in the travelling equilibrium state is illustrated in FIG. 9 as offset from a vertical alignment over the pivot axis of the wheels 124, in some aspects (such as if the mobile drive unit 20 is in a steady state moving at a constant velocity without appreciable acceleration), the center of gravity 103 may be vertically aligned over the wheels 124 during travel.

FIG. 10 illustrates the mobile drive unit 20 and the inventory holder 30 once the mobile drive unit 20 reaches the inventory holder 30. For example, the mobile drive unit 20 is illustrated in FIG. 10 in an un-tilted, stopped equilibrium state in which the center of gravity 103 of the mobile drive unit 20 is vertically aligned over the wheels 124. Although the mobile drive unit 20 is illustrated in FIG. 10 as untilted, in some aspects (e.g., if the center of gravity 103 is not centered within the mobile drive unit 20), the body of the mobile drive unit 20 may be tilted during a stopped equilibrium state.

FIG. 11 illustrates operation of mobile drive unit 20 in docking with inventory holder 30. Upon reaching the inventory holder 30, the mobile drive unit 20 can begin a docking process, e.g., from a position beneath the inventory holder 30 and from a stopped equilibrium state. In the illustrated example, the docking process includes the mobile drive unit 20 raising the docking head 110 towards the docking surface 350, as indicated by arrow 410. Additionally, in the illustrated example, mobile drive unit 20 and inventory holder 30 are configured so that mobile drive unit 20 lifts inventory holder 30 off the ground when mobile drive unit 20 docks with inventory holder 30 and, as a result, mobile drive unit 20 supports the weight of inventory holder 30 while mobile drive unit 20 is docked to inventory holder 30. Furthermore, in the illustrated example, the inventory holder 30 has a center of gravity 102 that is located apart from a centerline 107 of the inventory holder 30.

Figure 12:
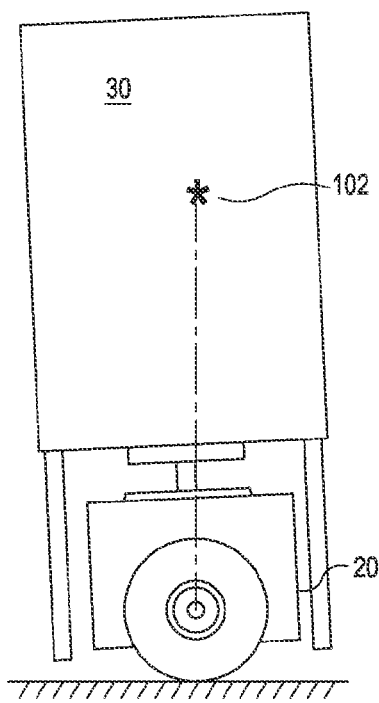

FIG. 12 illustrates operation of the mobile drive unit 20 after docking with the inventory holder 30. The mobile drive unit 20 can account for the location of the center of gravity 102 within the inventory holder 30 and respond with movement that brings the lifted payload (e.g., the inventory holder 30) into a stopped equilibrium state or within a predetermined deviation thereof. For example, in FIG. 12, the mobile drive unit 20 is illustrated with the center of gravity 102 of the inventory holder 30 positioned in vertical alignment over the wheels 124.

Figure 13:
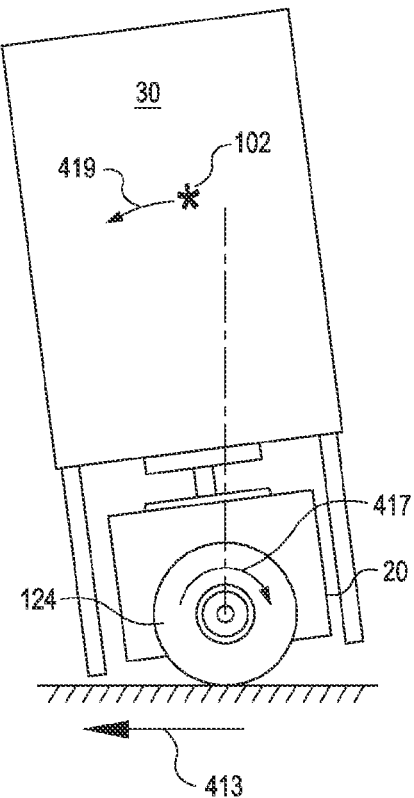

FIG. 13 illustrates operation of the mobile drive unit 20 to transition away from a stopped equilibrium state and toward a travelling equilibrium state while docked with the inventory holder 30. To prepare to travel in a desired direction of travel (e.g., toward the left of FIG. 13, as illustrated by arrow 413), the wheels 124 are rotated toward an opposite direction (e.g., as illustrated by arrow 417, causing the wheels to rotate clockwise in FIG. 13). This can cause the center of gravity 102 to shift relative to the mobile drive unit 20 toward the desired direction of travel (e.g., as illustrated by arrow 419, rotating toward the left of FIG. 13 and resulting in a first deviation from a vertical centerline through a pivot axis of the wheels 124), such as to provide momentum in the desired direction of travel and/or to provide a degree of tilt that will be at least partially counteracted by acceleration of the wheels 124 in the desired direction of travel 413.

Figure 14:
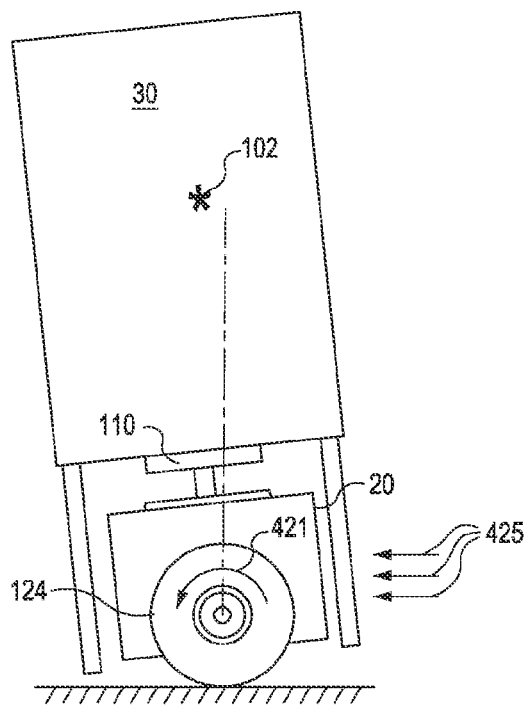

FIG. 14 illustrates operation of the mobile drive unit 20 in a travelling equilibrium state. The center of gravity 102 is illustrated at a second deviation from the vertical centerline through the pivot axis of the wheels 124, and this second deviation is smaller than the first deviation shown in FIG. 13. This may be a result of the degree of tilt of the inventory holder 30 being at least partially counteracted as the wheels accelerate 124 in the direction of desired travel (e.g., toward the left of FIG. 14, as illustrated by the arrow 421). Further, the mobile drive unit 20 and inventory holder 30 are illustrated in FIG. 14 in a tilted, travelling equilibrium state in which moments acting on the inventory holder 30 (e.g., due to the location of the center of gravity 102 and the acceleration experienced by the inventory holder 30) are suitably balanced so that rotation of the wheels 124 move the mobile drive unit 20 and docked inventory holder 30 toward the specified location (e.g., as illustrated by arrows 425). Additionally, although the center of gravity 102 of the inventory holder 30 in the travelling equilibrium state is illustrated in FIG. 14 as offset from vertical alignment over the pivot axis of the wheels 124, in some aspects (such as if the mobile drive unit 20 and inventory holder 30 are in a steady state moving at a constant velocity without appreciable acceleration), the center of gravity 102 may be vertically aligned over the wheels 124 during travel.

As may be appreciated, the mobile drive unit 20 is capable of inducing translational and/or rotational movement in inventory holder 30 while mobile drive unit 20 is docked with inventory holder 30. For example, in the illustrated embodiment, inventory holder 30 is supported by mobile drive unit 20 while the two components are docked and mobile drive unit 20 is capable of inducing translational and/or rotational movement in inventory holder 30 by moving or rotating itself or some sub-component of itself, such as docking head 110. As a result, while mobile drive unit 20 and inventory holder 30 are docked mobile drive unit 20 may move inventory holder 30 to a requested destination based on commands received by mobile drive unit 20.

Once mobile drive unit 20 and inventory holder 30 arrive at the destination, mobile drive unit 20 may additionally rotate inventory holder 30 to present a particular face of inventory holder 30 to a packer or otherwise maneuver inventory holder 30 to allow access to inventory items 40 stored by inventory holder 30. Mobile drive unit 20 may then undock from inventory holder 30, as described below, or move the inventory holder 30 to another destination. For example, mobile drive unit 20 may move inventory holder 30 to a packing station where a packer can select appropriate inventory items 40 from inventory holder 30. Mobile drive unit 20 may then return inventory holder 30 to its original location or another location appropriate for undocking, such as a new storage location reserved for inventory holder 30.

Figure 15:
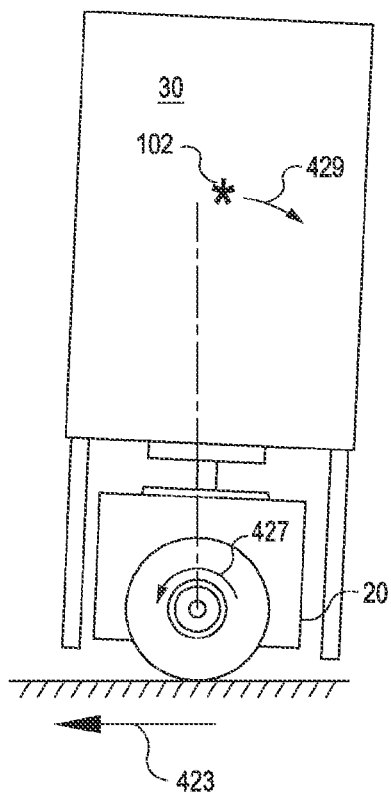

FIG. 15 illustrates operation of the mobile drive unit 20 to transition away from a travelling equilibrium state and toward a stopped equilibrium state while docked with the inventory holder 30. To prepare to stop while travelling in the desired direction of travel (e.g., toward the left of FIG. 15, as illustrated by arrow 423), the wheels 124 may be operated to shift the center of gravity 102 of the inventory holder away from the direction of travel. For example, the wheels 124 may briefly accelerate in the direction of travel (e.g., rotate counterclockwise in FIG. 15, as illustrated by the arrow 427) to cause a relative shift of the center of gravity 102 of the inventory holder 30 away from the direction of travel (e.g., as illustrated by arrow 429, rotating toward the right of FIG. 15 and resulting in the illustrated third deviation from the vertical centerline through the pivot axis of the wheels 124). Such an action may provide a degree of tilt that will be at least partially counteracted by deceleration of the wheels 124 as the mobile drive unit 20 and the inventory holder 30 come to rest and/or toward a stopped equilibrium state.

Figure 16:
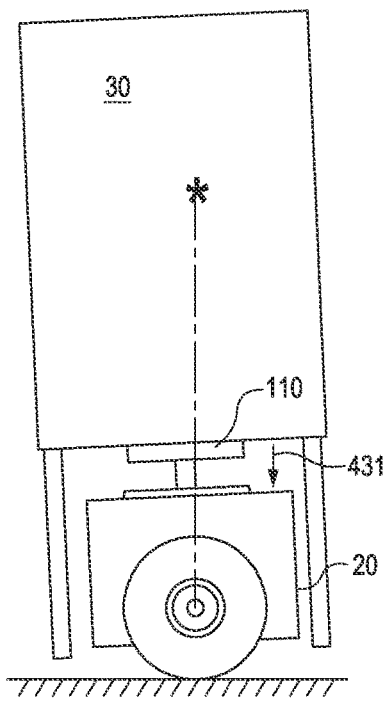

FIG. 16 illustrates mobile drive unit 20 and inventory holder 30 when the two components arrive at an appropriate point for undocking, e.g., when mobile drive unit 20 and the inventory holder 30 have arrived in a stopped equilibrium state from a travelling equilibrium state. As noted above, this may represent a final destination specified by the original command, the original storage location for inventory holder 30, or any other point within the workspace. After reaching the undocking location, mobile drive unit 20 initiates an appropriate undocking process based on the configuration and characteristics of mobile drive unit 20 and inventory holder 30, e.g., lowering the docking head 110, such as illustrated by arrow 431.

Figure 17:
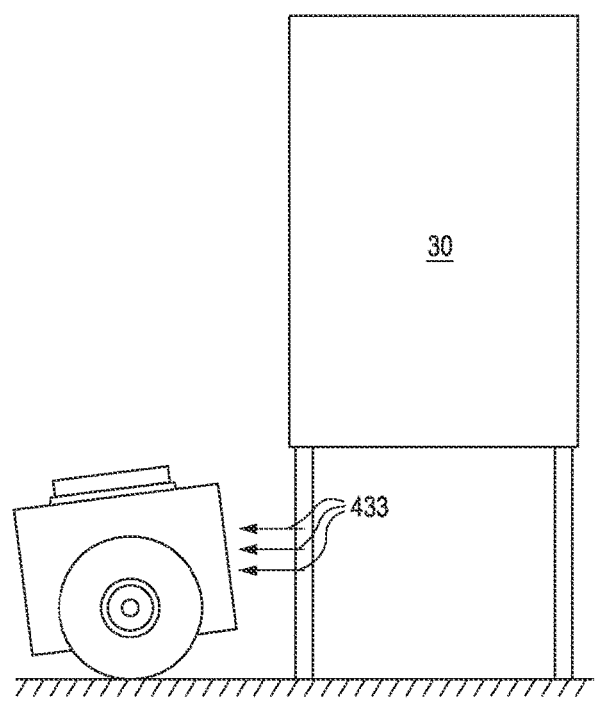

FIG. 17 illustrates a mobile drive unit 20 and inventory holder 30 subsequent to undocking. Mobile drive unit 20 may then move away, as suggested by arrow 433, from inventory holder 30 and begin responding to other commands received by mobile drive unit 20.

FIGS. 18-21 illustrate a kickstand 555 that can be utilized on a mobile drive unit 520 in various embodiments. Although the kickstand 555 is primarily shown in FIGS. 18-21 in conditions in which the mobile drive unit 520 is not carrying a payload such as an inventory holder, in various embodiments, the kickstand 555 can additionally or alternatively be used to facilitate operations of the mobile drive unit 520 in a loaded state or during lifting or other operations that transition the mobile drive unit 520 between loaded and unloaded states. The kickstand 555 can include any suitable structure for biasing a portion of the mobile drive unit 520 away from a support surface on which the mobile drive unit 520 can drive or travel. For example, the kickstand 555 can include an arm and/or a castor or knob that contacts the support surface and prevents the portion of the mobile drive unit 520 from contacting the support surface, e.g., when the payload is lifted by the mobile drive unit 520 and is out of the stopped equilibrium position.

FIG. 18 illustrates the kickstand 555 in a retracted position and a front of the mobile drive unit 520 contacting a support surface over which the mobile drive unit 520 can drive. In such a situation, the motorized wheel 524 may lack adequate torque to rotate the body of the mobile drive unit 520 to a position in which the motorized wheel 524 (or other inverted pendulum system) can rotate a sufficient amount to counteract a deviation from a stopped equilibrium position of a lifted payload.

In FIG. 19, the kickstand 555 is shown in an extended position in which the front of the mobile drive unit 520 is raised off the support surface by the kickstand 555. For example, in such a position, the motorized wheel 524 may be capable of causing rotation of the center of gravity of a payload. In various embodiments, this position may allow the mobile drive unit 520 to conserve power until motion is instructed, present a payload of the mobile drive unit 520 in a stationary state to an operator, provide a friction surface to facilitate deceleration, and/or achieve other benefits. Additionally or alternatively, such a position may permit the mobile drive unit 520 to reach a position in which a docking head 530 or other lifting system can operate to lift an inventory holder to a docked state relative to the mobile drive unit 520.

In FIG. 20, mobile drive unit 520 is shown driving along the support surface (e.g., shown by arrows 557) with the kickstand extended. In some embodiments, when the kickstand 555 is extended, the kickstand 555 is positioned in a location at which the kickstand is not interfering with motion of the mobile drive unit 520. For example, in such a position, the kickstand 555 may permit tilting of the mobile drive unit 520 to account for a deviation from an equilibrium state. In some embodiments, the kickstand 555 may be fixed in such a position, while in other embodiments, the kickstand 555 is deployable to or from such a position by suitable actuation, such as via a linear or rotational actuator.

For example, in FIG. 21, the kickstand 555 is shown in a retracted position within the body of the mobile drive unit 520. In some embodiments, the kickstand 555 may be deployable to such a state to increase an amount that the body of the mobile drive unit 520 can tilt during operation. Although the kickstand 555 is illustrated relative to a front of the body of the mobile drive unit 520, the kickstand 555 can be additionally or alternatively provided relative to a rear or other portion of the body of the mobile drive unit.

FIG. 22 illustrates another example of an inverted pendulum system 682. In FIG. 22, the inverted pendulum system 682 includes a rolling element 684 that is a sphere. Motors 686 can be positioned along different positions along the surface of the sphere 684 to cause motion of the sphere 684. For example, the motors 686 may impart motion to the sphere 684 along different axes so that the sphere 684 can be controlled to pivot in any direction, for example, to counteract a deviation of a payload from an equilibrium position. Such an inverted pendulum system 682 (or components thereof) can be used along with or in place of features described elsewhere herein, such as for the mobile drive unit 520 (e.g., features represented in any of FIGS. 4-7 or 18-22).

Figure 23:
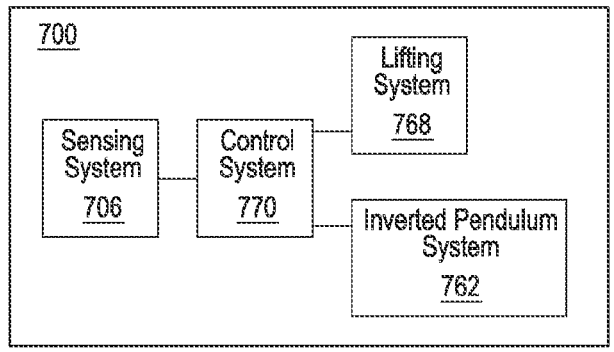
FIG. 23 illustrates a block diagram of components of a mobile drive unit according to certain embodiments.

FIG. 23 illustrates a block diagram of components of an inventory system 700 according to certain embodiments. The inventory system 700 includes a control system or module 770 (e.g., an example of control module 570), an inverted pendulum system 762 (e.g., including the motorized wheels 524 or the spherical rolling element 684), a sensor system 706 (e.g., an example of sensor set 506), and a lifting system 768 (e.g., an example of the docking head assembly 130). The control module 770 can be communicatively coupled with the sensor system 706 and receive sensing information indicative of information obtained by the sensing system 706. The control system 770 can also be communicatively coupled with the inverted pendulum system 762 and/or the lifting system 768, which may allow the control system 770 to control the inverted pendulum system 762 and/or the lifting system 768 based on information from the sensing system 706. For example, the control system 770 may control the lifting system 768 and/or the inverted pendulum system 762 (e.g., based on data from the sensing system 706) to perform any or all of the operations described or shown with respect FIGS. 9-22 and any other operations described herein.

Figure 24:
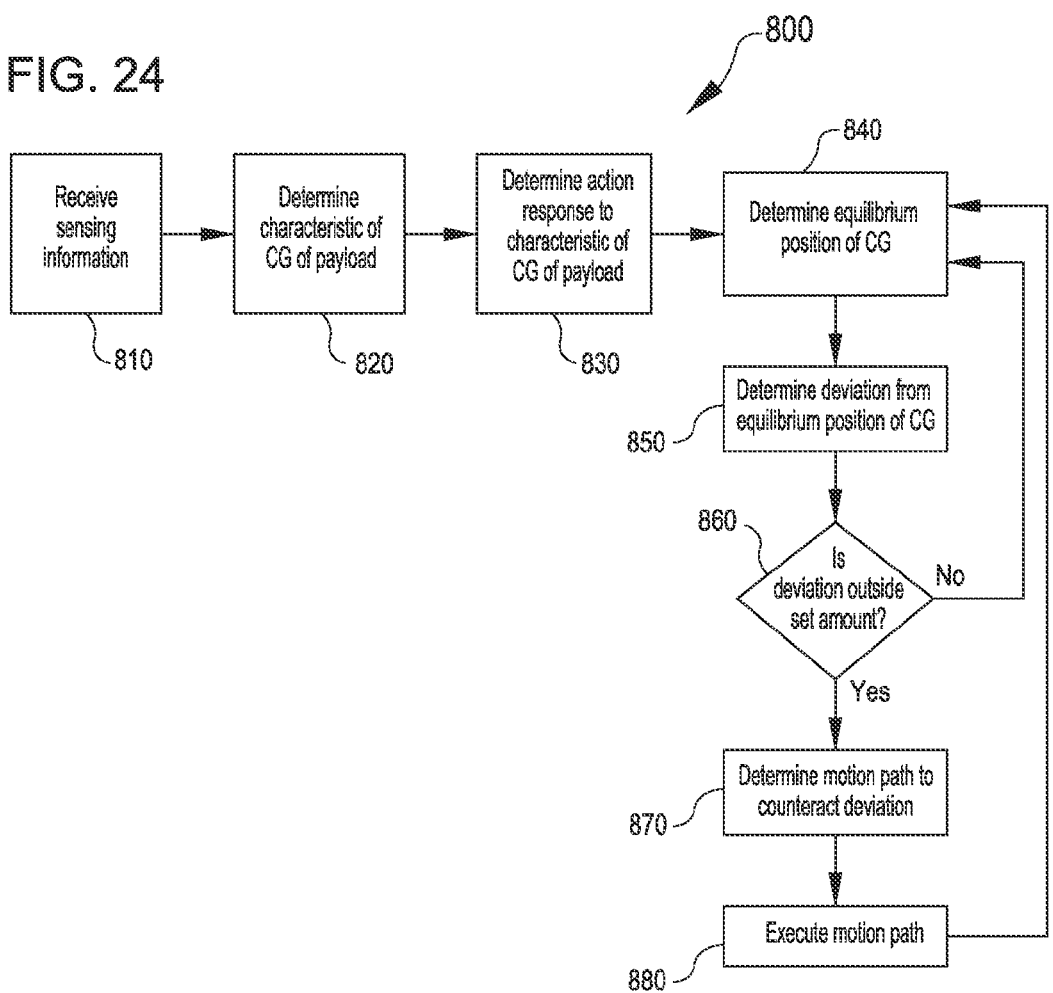
FIG. 24 is a flowchart illustrating an example of a process that can be performed with the components of FIG. 23 according to certain embodiments.

For example, FIG. 24 illustrates a process 800 that can be performed by the control module 770 of FIG. 23. The process 800 at block 810 includes receiving sensing information. The sensing information can be based on information obtained, e.g., from the sensing system 706. For example, the sensing information may correspond to information about at least one of an orientation of the body of the mobile drive unit 520, motion of the body of the mobile drive unit 520, and/or forces acting on the body of the mobile drive unit 520 (e.g., which can include forces acting on the payload of the mobile drive unit 520).

At block 820, the process 800 can include determining a characteristic of a center of gravity (CG) of a payload. For example, block 820 may include determining any characteristic of the center of gravity of the payload, including but not limited to, determining any actual or expected position, orientation, acceleration, rate of movement, equilibrium position, or deviation from the equilibrium position, of the center of gravity of the payload or of a component thereof (such as of a center of gravity of an inventory holder docked with a mobile drive unit and/or of a center of gravity of a mobile drive unit, whether docked or undocked).

At block 830, the process 800 can include determining an action response to the characteristic of the center of gravity of the payload. For example, the action response may include performing the operations of blocks 810 and/or block 820 to determine another characteristic of the center of gravity of the payload.

One example of a response action is illustrated at block 840. At block 840, the process 800 can include determining an equilibrium state of the CG, e.g., based on the sensing information from the block 810. For example, the equilibrium state of the CG may correspond to an equilibrium state of the mobile drive unit (e.g., when the mobile drive unit is traveling or stopped in between docking operations with inventory holders), and/or the equilibrium state of the CG may correspond to an equilibrium state of a mobile drive unit that is docked with an inventory holder docked (e.g., when the drive unit is traveling or stopped in a docked state). In some embodiments, the operation of block 840 may include determining the equilibrium position of the CG of the payload based on characteristics (e.g., determined at 820) of a center of gravity of the mobile drive unit and/or characteristics of a center of gravity of an inventory holder docked with the mobile drive unit.

At block 850, the process 800 can include determining a deviation from the equilibrium state of the payload. For example, the deviation may include an amount that the payload is tilting away from or toward the equilibrium state and/or a rate of change of the tilt.

At block 855, the process 800 can include determining if the deviation is outside of a predetermined threshold. This may correspond to an actual or predicted deviation. If the deviation is not outside of a predetermined threshold, (e.g., NO at block 860), the process may iterate and proceed back to the operation of block 840. If the deviation is outside the predetermined threshold (e.g., YES at block 860), the process at 870 may determine a motion path to counteract the deviation from equilibrium, and at 880, execute the motion path to counteract the deviation (e.g., by controlling a propulsion system or other inverted pendulum system of the mobile drive unit). Upon execution of the motion path, the process 800 may iterate and proceed back to the operation of block 840. In this way, the process 800 can be utilized to maintain the deviation within a predetermined threshold from the equilibrium state, e.g., regardless of whether the mobile drive unit is in a docked state or an undocked state. Additionally, although the process 800 at block 860 and/or at block 880 is illustrated as iterating back to block 840, the process may additionally or alternatively include other combinations of the illustrated blocks in iteration. For example, the process 800 may return to 810 to continually receive updated sensing information, determine the CG, and perform actions for maintaining within a predetermined amount of the equilibrium position.

Other response actions at block 830 are additionally or alternatively possible. In one example, the response action can include changing a lift approach of the lifting system 768. Such a response action may be performed as a result of an initial lift operation of the lifting system 768 to lift an inventory holder and a corresponding determination that a characteristic of the CG of the payload resulting from the initial lift is not within a desired range. For example, the lift approach may be changed by adjusting an alignment of the drive unit for lifting in response to a determination (e.g., based on sensing information) that an equilibrium position resulting from the initial lift is not within a desired range (e.g., would require an undesirable amount of operation of the drive module to maintain the deviation within a predetermined threshold).

A further example of a response action can include determining a motion path for performing motion instructions. The motion instructions may correspond, for example, to tasks assigned to a mobile drive unit, such as to remain in a particular position, or to travel between locations of the inventory system. Such a response action may accordingly include determining an appropriate series of actions to cause the mobile drive unit to move from place to place based on the determined characteristics of the CG of the payload. For example, a motion path to move a mobile drive unit from a stopped equilibrium state to a travelling equilibrium state may include rotating the wheels of the mobile drive unit in a direction opposite of the desired direction of travel (which may cause a corresponding tilt of the CG of the payload in the desired direction) and then providing a suitable amount of acceleration to the wheels of the mobile drive unit to maintain a desired offset between the pivot axis and the CG of the payload in the travelling equilibrium state. As another example, a motion path to move a mobile drive unit from a travelling equilibrium state to a stopped equilibrium state may include rotating the wheels of the mobile drive unit to accelerate in the direction of travel (which may cause a corresponding tilt of the CG of the payload away from the direction of travel) and then operating the wheels to provide a suitable amount of deceleration that will both bring the mobile drive unit substantially to rest and cause the pivot axis to align with the CG of the payload in the stopped equilibrium state. As a further example, the motion path to cause the mobile drive unit to turn may include a rolling turn in which an outer wheel turns faster while still being operated in conjunction with the inner wheel to keep the payload within a predetermined deviation from equilibrium and/or a stopped turn in which the wheels are rotated in opposite directions at rates that keep the payload within a predetermined deviation from equilibrium. As may also be appreciated, similar motion paths may additionally be utilized for moving the mobile drive unit when not loaded with a payload such as an inventory holder.

FIG. 25 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing information which can be used by modules described herein, such as resource scheduling information 1012, route planning information 1014, segment reservation information 1016, and/or inventory information 1018. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 25. Thus, the depiction of the system 1000 in FIG. 25 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A mobile drive unit, comprising:
   a body;
   a docking head assembly configurable relative to the body between (i) a docked state in which a payload of the mobile drive unit comprises an inventory holder lifted and carried by the mobile drive unit, and (ii) an undocked state in which the mobile drive unit is not carrying an inventory holder;
   a drive module comprising at least one rolling element rotatable to move the body along a support surface, the body pivotable about the at least one rolling element toward or away from an equilibrium state in which moments acting on at least one of the mobile drive unit or the inventory holder are balanced;
   a sensor set comprising at least one sensor configured to sense information about at least one of the mobile drive unit or the inventory holder; and
   a control module configured to:
      receive sensing information from the sensor set, the sensing information indicative of a deviation of at least one of the mobile drive unit or the inventory holder from the equilibrium state;
      control the drive module of the mobile drive unit so as to move the mobile drive along a first travel path to the inventory holder by iteratively:
         receiving information about the body of the mobile drive unit
         determining, based on the information about the body, a deviation of the body from a body equilibrium state in which moments acting on the body are balanced;
         determining an undocked operation of the drive module to both counteract the deviation of the body from the body equilibrium state and maintain the mobile drive unit in motion along the first travel path; and
         controlling the drive module so as to perform the undocked operation;
      control a lifting system of the mobile drive unit to lift the inventory holder relative to the mobile drive unit so that the inventory holder is carried by the mobile drive unit;
      control the drive module of the mobile drive unit so as to move the mobile drive unit with the inventory holder carried by the mobile drive unit along a second travel path by iteratively:
         receiving information about the payload comprising the inventory holder carried by the mobile drive unit
         determining, based on the information about the payload, a deviation of the payload from a payload equilibrium state in which moments acting on the payload are balanced;
         determining a docked operation of the drive module to both counteract the deviation of the payload from the payload equilibrium state and maintain the mobile drive unit in motion along the second travel path; and
         controlling the drive module so as to perform the docked operation; and
         control the drive module so as to maintain the deviation of the payload in the docked configuration within a predetermined amount from the equilibrium state.

2. The mobile drive unit of claim 1, wherein the control module is further configured to control the drive module so as to maintain a deviation of the body in the undocked configuration within a predetermined amount from the equilibrium state.

3. The mobile drive unit of claim 1, wherein the at least one rolling element comprises a first wheel and a second wheel positioned on opposite sides of the body.

4. The mobile drive unit of claim 1, wherein the at least one rolling element comprises a spherical rolling element.

5. The mobile drive unit of claim 1, wherein the sensor set comprises a rate gyroscope configured to provide sensing information that includes an angular velocity of the body.

6. The mobile drive unit of claim 1, wherein the sensor set comprises an accelerometer configured to provide sensing information that includes an acceleration of the body toward a front or a rear of the body.

7. The mobile drive unit of claim 1, wherein the sensor set comprises a weight sensor configured to provide sensing information that includes information about at least one of a weight of the inventory holder or a location of a center of gravity of the inventory holder.

8. The mobile drive unit of claim 1, wherein the sensor set comprises a motor torque sensor configured to provide sensing information that includes information about a torque provided by a motor of the drive module.

9. The mobile drive unit of claim 1, wherein the sensor set comprises a motor velocity sensor configured to provide sensing information that includes information about a velocity provided by a motor of the drive module.

10. The mobile drive unit of claim 1, further comprising a kickstand comprising a structure configured to bias a portion of the mobile drive unit away from the support surface when at least one of the mobile drive unit or the inventory holder is out of the equilibrium state.

11. The mobile drive unit of claim 10, wherein the kickstand is movable relative to the body.

12. The mobile drive unit of claim 1, wherein:
   the inventory holder comprises one or more compartments holding one or more inventory items;
   the mobile drive unit is configured to move a payload within a facility;
   the docking head assembly comprises a platform movable relative to the body to engage and lift the inventory holder to reach the docked state in which the inventory holder is carried by the mobile drive unit and in which the payload comprises the inventory holder, the platform further movable relative to the body to reach the undocked state in which the mobile drive unit is not carrying the inventory holder;
   the drive module further comprises a first motor and a second motor;
   the at least one rolling element comprises a first wheel driven by the first motor and a second wheel driven by the second motor;
   the first wheel and the second wheel are positioned on opposite sides of the body;
   the first wheel and the second wheel are operable when in contact with the support surface to move the body relative to the support surface;
   the first wheel and the second wheel are rotatable about a pivot axis such that the body is pivotable in the docked state about the pivot axis toward or away from a payload equilibrium state in which a center of gravity of the payload is vertically aligned over the pivot axis; and the sensor set is configured to sense information about the payload;

the control module is configured to receive sensing information from the sensor set, the sensing information comprising information about at least one of an orientation of the payload, motion of the payload, or forces acting on the payload; and the control module is configured to control the first motor and the second motor based on the sensing information so as to move the first wheel and the second wheel such that the payload is moved toward or away from the payload equilibrium state in the docked state.

13. The mobile drive unit of claim 12, wherein the sensing information further comprises information about the body in the undocked state, wherein the control module is further configured to control the first motor and the second motor based on the sensing information so as to move the first wheel and the second wheel such that the body is moved toward or away from an equilibrium state of the body in the undocked state.

14. The mobile drive unit of claim 12, wherein the sensor set comprises sensors on or in the body of the mobile drive unit, the sensors including at least one of:

a rate gyroscope configured to provide sensing information that includes an angular velocity of the body;

an accelerometer configured to provide sensing information that includes an acceleration of the body toward a front or a rear of the body;

a weight sensor configured to provide sensing information that includes information about at least one of a weight of the inventory holder or a location of a center of gravity of the inventory holder;

a motor torque sensor configured to provide sensing information that includes information about a torque provided by at least one of the first motor or the second motor of the drive module; or a motor velocity sensor configured to provide sensing information that includes information about a velocity provided by at least one of the first motor or the second motor of the drive module.

15. The mobile drive unit of claim 1, wherein the mobile drive unit further comprises a kickstand at a respective end of the body comprising a front end or a rear end of the body, the kickstand configured to prevent the respective end from contacting the support surface when the body is out of an equilibrium state of the body.

16. The mobile drive unit of claim 1, wherein the control module is further configured to control the lifting system of the mobile drive unit to lift the inventory holder relative to the mobile drive unit so that the inventory holder is carried by the mobile drive unit by iteratively:

receiving information about a center of gravity of the inventory holder;

determining, based on the information about the center of gravity of the inventory holder, a deviation of the center of gravity of the inventory holder from an inventory holder equilibrium state in which moments acting on the center of gravity of the inventory holder are balanced;

determining an adjusting operation of the drive module to counteract the deviation of the center of gravity of the inventory holder from the inventory holder equilibrium state;

controlling the drive module so as to perform the adjusting operation; and controlling the lifting system to lift the inventory holder an incremental amount.

17. The mobile drive unit of claim 1, wherein the control module is further configured to control the lifting system so as to undock from the inventory holder and re-dock with the inventory holder in a different alignment in response to information received about the center of gravity of the inventory holder.

18. The mobile drive unit of claim 1, wherein the control module is further configured to deploy a kickstand so as to at least one of:

stabilize the mobile drive unit prior to or during a lifting operation;

move a bottom portion of the mobile drive unit away from a support surface on which the mobile drive unit travels to a position in which the drive module is capable of performing operations for counteracting deviations from equilibrium states; or prevent a bottom portion of the mobile drive unit from dropping to a position relative to the support surface in which the drive module is incapable of performing operations for counteracting deviations from equilibrium states.

19. The mobile drive unit of claim 18, wherein the control module is further configured to retract the kickstand.

\* \* \* \* \*